US012328611B2

(12) United States Patent
Liu et al.

(10) Patent No.: US 12,328,611 B2
(45) Date of Patent: Jun. 10, 2025

(54) TECHNIQUES FOR PERFORMING MINIMIZATION OF DRIVE TEST (MDT)

(71) Applicant: QUALCOMM Incorporated, San Diego, CA (US)

(72) Inventors: Huichun Liu, Beijing (CN); Peng Cheng, Beijing (CN); Xipeng Zhu, San Diego, CA (US); Gavin Bernard Horn, La Jolla, CA (US); Ozcan Ozturk, San Diego, CA (US)

(*) Notice: Subject to any disclaimer, the term of this patent is extended or adjusted under 35 U.S.C. 154(b) by 307 days.

(21) Appl. No.: 17/426,589

(22) PCT Filed: Jan. 30, 2020

(86) PCT No.: PCT/CN2020/074079
§ 371 (c)(1),
(2) Date: Jul. 28, 2021

(87) PCT Pub. No.: WO2020/156499
PCT Pub. Date: Aug. 6, 2020

(65) Prior Publication Data
US 2022/0104050 A1    Mar. 31, 2022

(30) Foreign Application Priority Data

Jan. 31, 2019    (WO) ................ PCT/CN2019/074194

(51) Int. Cl.
*H04W 24/10*    (2009.01)
*H04W 68/02*    (2009.01)

(52) U.S. Cl.
CPC .......... *H04W 24/10* (2013.01); *H04W 68/02* (2013.01)

(58) Field of Classification Search
CPC .............................. H04W 24/10; H04W 68/02
(Continued)

(56) References Cited

U.S. PATENT DOCUMENTS 9,967,753 B1*  5/2018  Jadunandan ............ H04W 4/24
2011/0319115 A1* 12/2011  Racz ...................... H04W 24/10
                                                              455/67.11
(Continued)

FOREIGN PATENT DOCUMENTS

CN    103234540 A    8/2013
CN    103591952 A    2/2014
(Continued)

OTHER PUBLICATIONS

"3rd Generation Partnership Project, Technical Specification Group Radio Access Network, Evolved Universal Terrestrial Radio Access and Evolved Universal Terrestrial Radio Access Network, Overall Description, Stage 2 (Release 15)", 3GPP Draft 36300-F40, 3rd Generation Partnership Project, Mobile Competence Centre, 650, Route Des Lucioles, F-06921 Sophia-Antipolis Cedex, France, Jan. 15, 2019, XP051686899, 363 Pages, Clauses 7.3a.3, 23.2 and 19.2.2.19, Sub-Clause 19.2.2.19.1 with reference to Fig. 19.2.2.19. 1-1.
(Continued)

*Primary Examiner* — Joel Ajayi

(57) ABSTRACT

Certain aspects of the present disclosure generally relate to methods and apparatus for performing minimization of drive test (MDT) operations. For example, certain aspects provide a method for wireless communication. The method generally includes receiving, at a radio access network (RAN), a measurement configuration to start a trace of a user-equipment (UE), determining a transition of the UE to an inactive state, and sending one or more messages to coordinate the trace of the UE or indicate that the trace has failed in response to the determination.

19 Claims, 23 Drawing Sheets

(58) Field of Classification Search
USPC .......................................................... 455/458
See application file for complete search history.

(56) References Cited

U.S. PATENT DOCUMENTS

| | | | |
|---|---|---|---|
| 2015/0198447 | A1 | 7/2015 | Chen et al. |
| 2018/0270792 | A1* | 9/2018 | Park .................... H04W 68/025 |
| 2018/0279204 | A1* | 9/2018 | Kim ...................... H04W 48/02 |
| 2019/0116506 | A1* | 4/2019 | Bendlin .............. H04W 64/003 |
| 2019/0132705 | A1* | 5/2019 | Hapola .............. A63B 24/0021 |
| 2020/0120743 | A1 | 4/2020 | Jin et al. |
| 2024/0422606 | A1 | 12/2024 | Liu et al. |

FOREIGN PATENT DOCUMENTS

| | | |
|---|---|---|
| CN | 106332278 A | 1/2017 |
| CN | 207036119 U | 2/2018 |
| CN | 109089269 A | 12/2018 |
| CN | 109150362 A | 1/2019 |
| CN | 109246777 A | 1/2019 |
| WO | 2016172840 A1 | 11/2016 |
| WO | 2017063661 A1 | 4/2017 |
| WO | 2018082064 A1 | 5/2018 |
| WO | 2018228240 A1 | 12/2018 |

OTHER PUBLICATIONS

Anonymous: "3 Generation Partnership Project, Technical Specification Group Radio Access Network, Universal Terrestrial Radio Access and Evolved Universal Terrestrial Radio Access, Radio Measurement Collection for Minimization of Drive Tests, Overall Description, Stage 2 (Release 15)," 3GPP Standard, Technical Specification, 3GPP TS 37.320, 3rd Generation Partnership Project, Mobile Competence Centre, 650, Route Des Lucioles, F-06921 Sophia-Antipolis Cedex, France, vol. RAN WG2, No. V15.0.0, Jul. 6, 2018, XP051474826, 27 Pages, Clause 5.1.3.

"3rd Generation Partnership Project, Technical Specification Group Radio Access Network, Evolved Universal Terrestrial Radio Access Network, X2 Application Protocol (Release 15)," 3GPP Standard, Technical Specification, 3GPP TS 36.423, 3rd Generation Partnership Project, Mobile Competence Centre, 650, Route Des Lucioles, F-06921 Sophia-Antipolis Cedex, France, vol. RAN WG3, No. V15.4.0, Jan. 14, 2019, XP051591701, pp. 1-409, Clauses 8.3.13.1 and 8.3.13.2 with reference to Fig. 8.3.13.2-1, with clauses 9.1.2.28, 9.1.2.29, 9.2.2, 9.2.56 and 9.2.91.

"3rd Generation Partnership Project, Technical Specification Group Services and System Aspects, Telecommunication Management, Subscriber and Equipment Trace, Trace Control and Configuration Management (Release 15)," 3GPP Standard, Technical Specification, 3GPP TS 32.422, 3rd Generation Partnership Project, Mobile Competence Centre, 650, Route Des Lucioles, F-06921 Sophia-Antipolis Cedex, France, vol. SA WG5, No. V15.1.0, Jun. 21, 2018, XP051473057, pp. 1-189, Clauses 4.1.2.16, 4.2.3.12, Clause 4.1.2.12.3 with reference to Fig. 4.1.2.12.2.

Supplementary European Search Report—EP20747976—Search Authority—Miunich—Jan. 30, 2023.

International Search Report and Written Opinion—PCT/CN2019/074194—ISA/EPO—Nov. 7, 2019.

International Search Report and Written Opinion—PCT/CN2020/074079—ISA/EPO—Apr. 30, 2020.

Intel: "Report of Email Discussion [99bis#58] [LTE/Positioning] Measurements for IMU positioning", 3GPP TSG-RAN2 Meeting #101, R2-1803411 (Email Discussion On Measurements For IMU Positioning)_V3, 3rd Generation Partnership Project, Mobile Competence Centre, 650, Route Des Lucioles, F-06921 Sophia-Antipolis Cedex, vol. RAN WG2, No. Athens, Greece, Feb. 26, 2018-Mar. 2, 2018, Feb. 16, 2018, pp. 1-11, clause 2.1.2, p. 6, 7.

Supplementary Partial European Search Report—EP20747976—Search Authority—Munich—Sep. 22, 2022.

European Search Report—EP23204926—Search Authority—Munich—Feb. 7, 2024.

* cited by examiner

TECHNIQUES FOR PERFORMING MINIMIZATION OF DRIVE TEST (MDT)

CROSS-REFERENCE TO RELATED APPLICATIONS

This application claims priority to PCT Application No. PCT/CN2019/074194, filed Jan. 31, 2019, which is assigned to the assignee hereof and hereby expressly incorporated by reference herein in its entirety as if fully set forth below and for all applicable purposes.

BACKGROUND

Field of the Disclosure

Aspects of the present disclosure relate to wireless communication, and more particularly, to communication of techniques for minimization of drive test (MDT) operations.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for a method for wireless communication. The method generally includes receiving, at a user-equipment (UE), a measurement configuration from a network entity for collecting measurement information to be reported to the network entity, the measurement information comprising beam quality information, collecting the measurement information corresponding to the measurement configuration, and transmitting the measurement information to the network entity.

In certain aspects, the measurement information further comprises information regarding distribution of serving cells. In certain aspects, the measurement configuration comprises a minimization of drive test (MDT) configuration. In certain aspects, the measurement configuration configures the UE to log downlink pilot strength measurements, the method further comprising logging the downlink pilot strength measurements, and transmitting an indication of the downlink pilot strength measurements to the network entity.

In certain aspects, collecting the measurement information comprises performing radio resource measurements (RRM) via a type of reference signal indicated by the measurement configuration. The type of reference signal may include a synchronization signal or channel state information.

In certain aspects, the measurement configuration indicates whether to perform cell level measurement or beam level measurements when collecting the measurement information. In certain aspects, the measurement configuration indicates at least one of a beam index or beam quantity to use for the collecting of the beam quality information. In certain aspects, the measurement configuration indicates at least one of beam number to use for the collecting the beam quality information. In certain aspects, the measurement configuration indicates whether the measurement information comprises reference signal received quality (RSRQ) or reference signals received power (RSRP).

In certain aspects, the measurement configuration indicates a duration for which a measured beam quality is valid. In this case, the collecting of the measurement information may include measuring the beam quality, the method further comprising discarding the measured beam quality after the duration indicated by the measurement configuration. In certain aspects, the measurement configuration comprises an indication a time interval across which one or more beam quality measurements are logged when collecting the measurement information.

Certain aspects of the present disclosure generally relate to methods and apparatus for a method for wireless communication. The method generally includes generating a message having a measurement configuration for collecting measurement information to be reported to a network entity, the measurement information comprising beam quality information, transmitting a measurement configuration to a user-equipment (UE), and receiving another message having the measurement information corresponding to the measurement configuration.

In certain aspects, the measurement information further comprises information regarding distribution of serving cells. In certain aspects, the measurement configuration comprises a minimization of drive test (MDT) configuration. In certain aspects, the measurement configuration configures the UE to log downlink pilot strength measurements, and wherein the other message comprises an indication of the downlink pilot strength measurements.

In certain aspects, collecting the measurement information comprises performing radio resource measurements (RRM) via a type of reference signal indicated by the measurement configuration. In certain aspects, the type of reference signal comprises a synchronization signal or channel state information.

In certain aspects, the measurement configuration indicates whether to perform cell level measurement or beam level measurements when collecting the measurement information. In certain aspects, the measurement configuration indicates at least one of a beam index or beam quantity to use for the collecting of the beam quality information. In certain aspects, the measurement configuration indicates at least one of beam number to use for the collecting the beam quality information. In certain aspects, the measurement configuration indicates whether the measurement information comprises reference signal received quality (RSRQ) or reference signals received power (RSRP). In certain aspects, the measurement configuration indicates a duration for which a measured beam quality is valid. In certain aspects, the measurement configuration comprises an indication a time interval across which one or more beam quality measurements are logged when collecting the measurement information.

Certain aspects of the present disclosure generally relate to methods and apparatus for a method for wireless communication. The method generally includes determining, at a user-equipment (UE), location information associated with an out of coverage area, the location information being determined based on a location of the UE and data from one or more sensors, and reporting the location information to a network entity.

Certain aspects of the present disclosure generally relate to methods and apparatus for a method for wireless communication. The method generally includes receiving, at a first radio access network (RAN), a measurement configuration to start a trace of a user-equipment (UE), determining a transition of the UE to an inactive state, and sending one or more messages to coordinate the trace of the UE or indicate that the trace has failed in response to the determination.

Certain aspects of the present disclosure generally relate to methods and apparatus for a method for wireless communication. The method generally includes detecting whether a user-equipment (UE) is in an inactive state, determining a measurement configuration to start a trace of the UE, the measurement configuration being determined based on whether the UE is in the inactive state, generating a message comprising the measurement configuration, and sending the message to a radio access network to coordinate the trace.

Certain aspects of the present disclosure generally relate to methods and apparatus for a method for wireless communication. The method generally includes receiving a message having a measurement configuration to start a trace of a UE, the UE being in an inactive state, generating another message having the measurement configuration to start the trace, and transmitting the other message to the UE.

Aspects generally include methods, apparatus, systems, computer program products, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
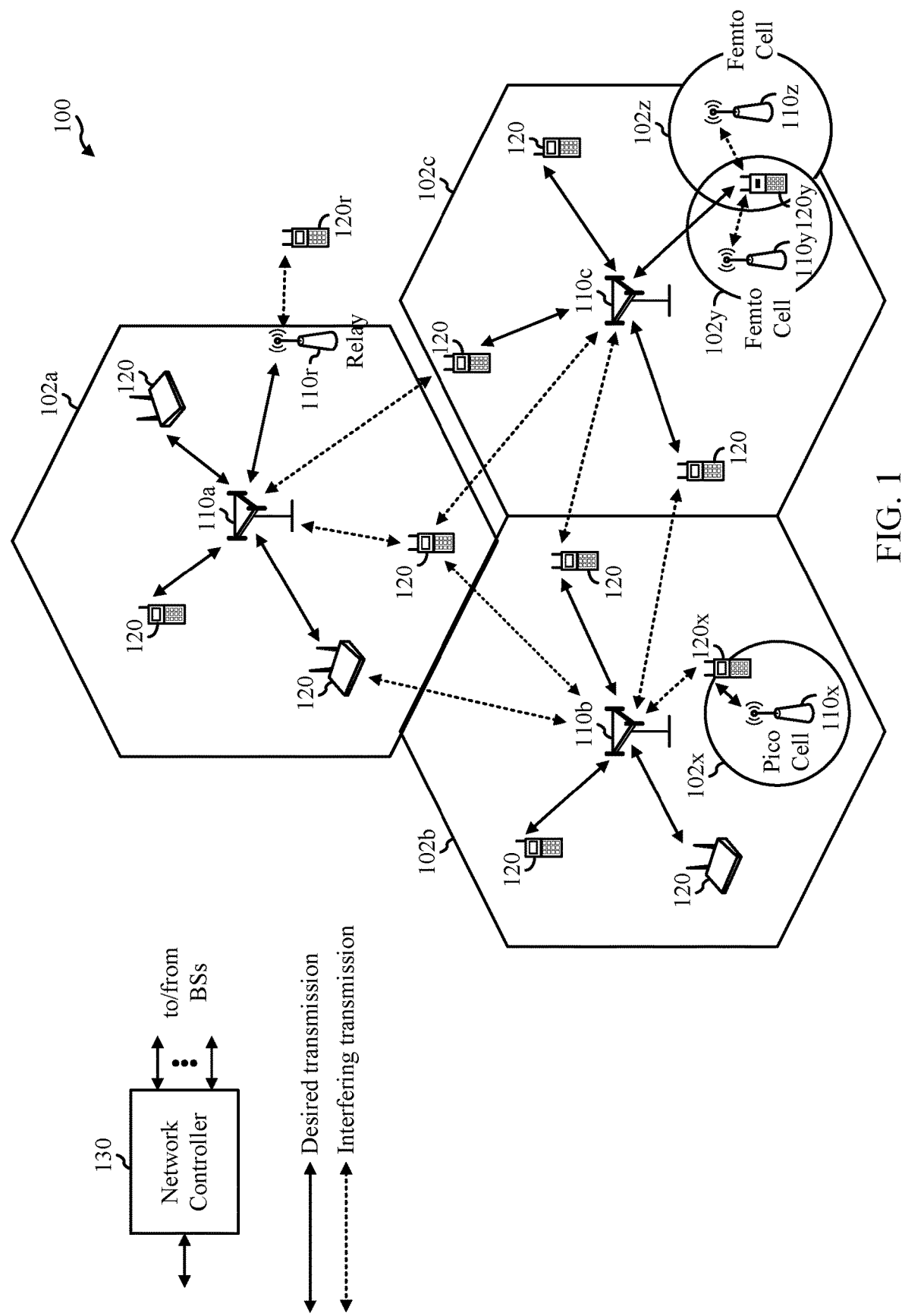
FIG. 1 is a block diagram conceptually illustrating an example telecommunications system, in accordance with certain aspects of the present disclosure.

Aspects of the present disclosure provide apparatus, methods, processing systems, and computer readable mediums for performing Minimization of Drive Test (MDT). For example, certain aspects provide MDT operations considering new types of coverage introduced by later generation specific features. For instance, new radio (NR) supports intra-cell beam level mobility (e.g., beam switch without RRC involvement) and introduces new type of beam coverage. Certain aspects of the present disclosure also provide an MDT specific logged measurement configuration with beam coverage, as well as new type of location information acquisition operations for MDT measurement which may be applicable to environments without support for GNSS or neighboring cell RF fingerprint. Certain aspects also provide techniques for performing immediate MDT and logged MDT handling for UE in RRC inactive state.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3 G, 4G, 5G, or NR wireless technologies, aspects of the present disclosure can be applied in other generation-based communication systems.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
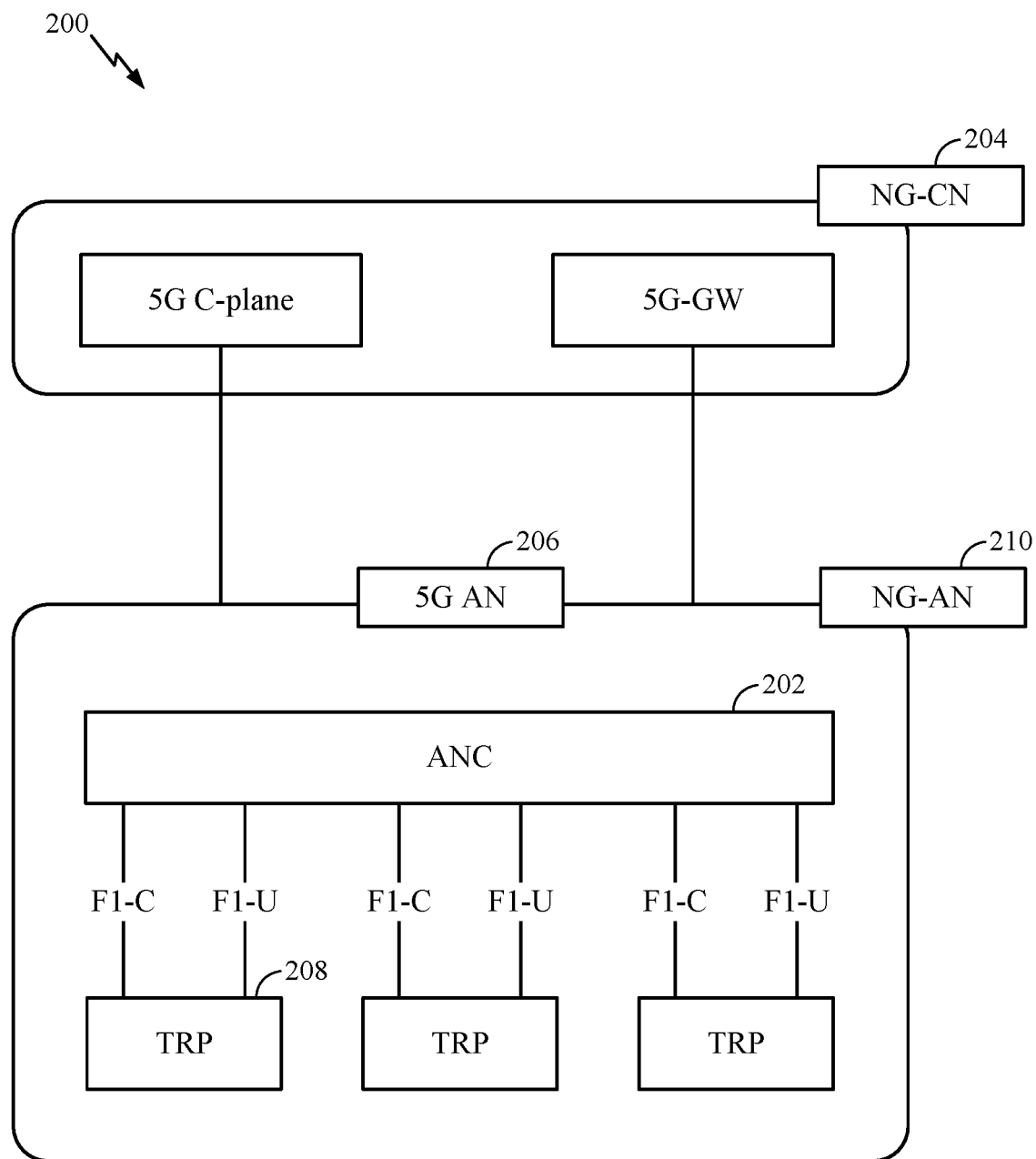
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
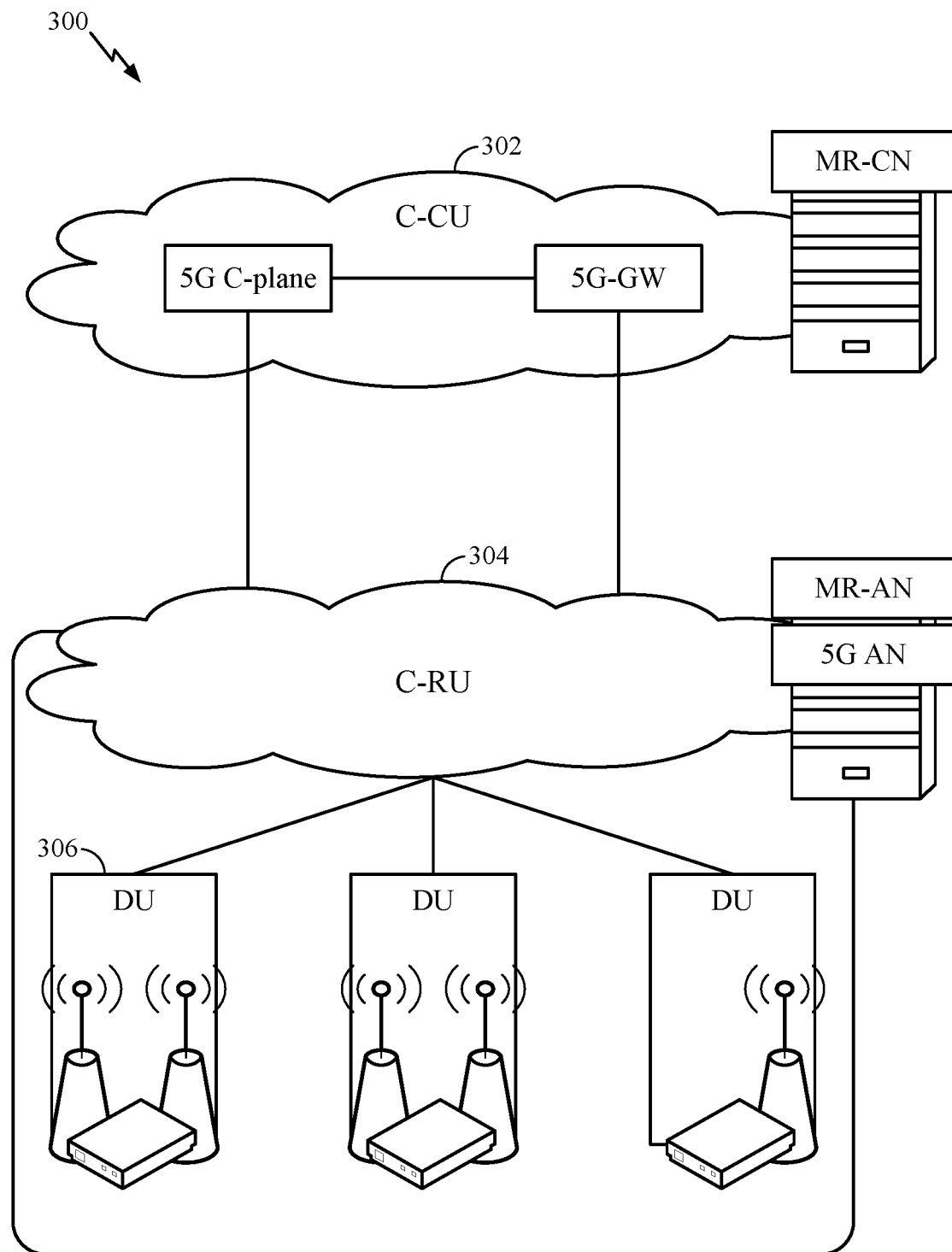
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
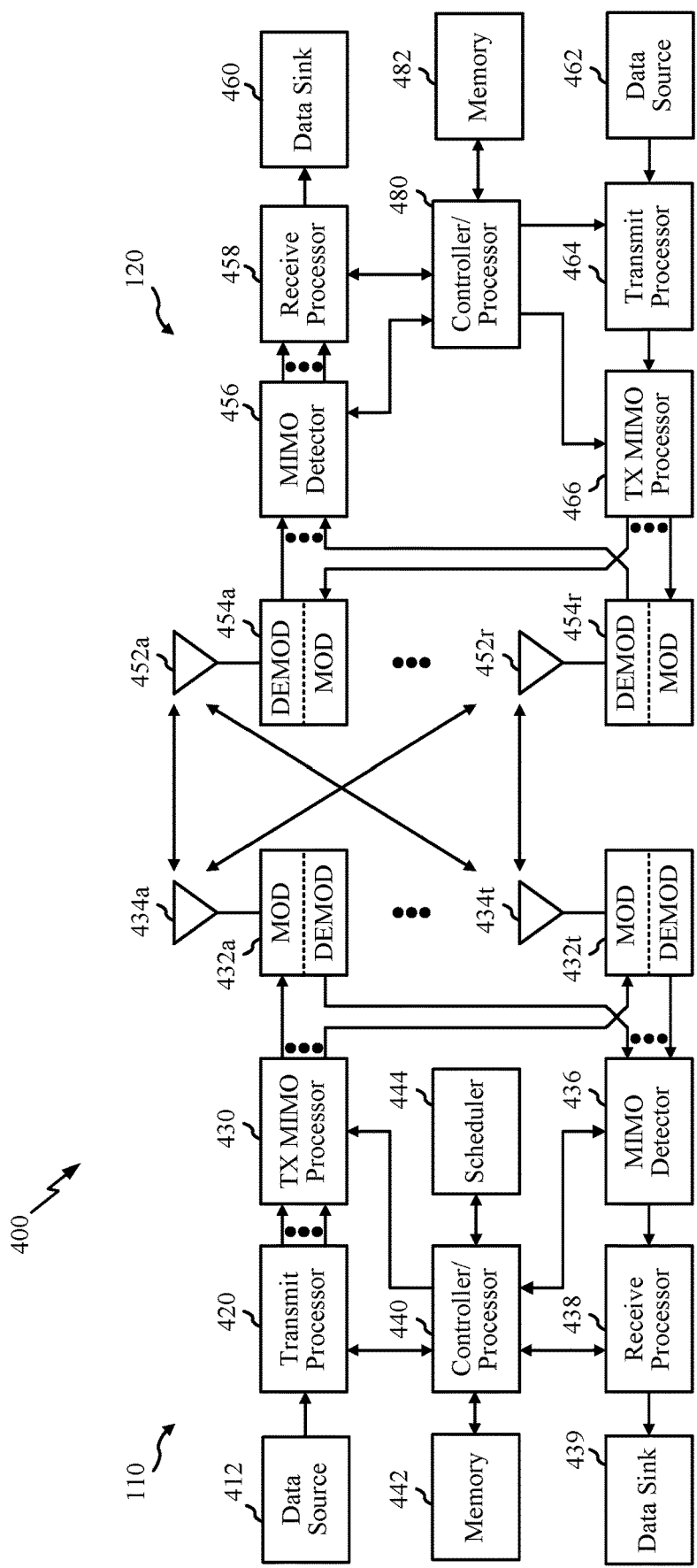
FIG. 4 is a block diagram conceptually illustrating a design of an example base station (B S) and user equipment (UE), in accordance with certain aspects of the present disclosure.

FIG. 4 illustrates example components 400 of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
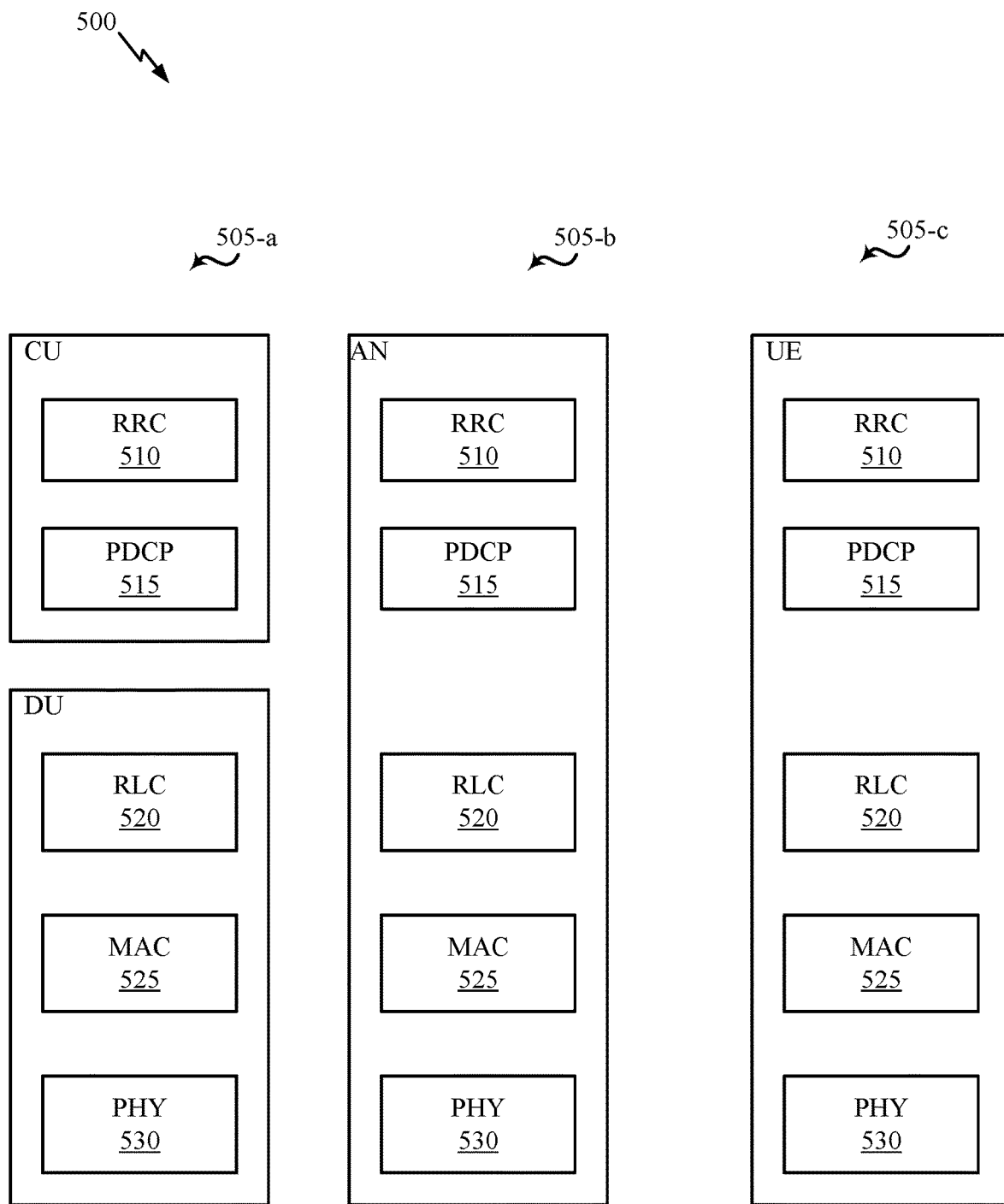
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
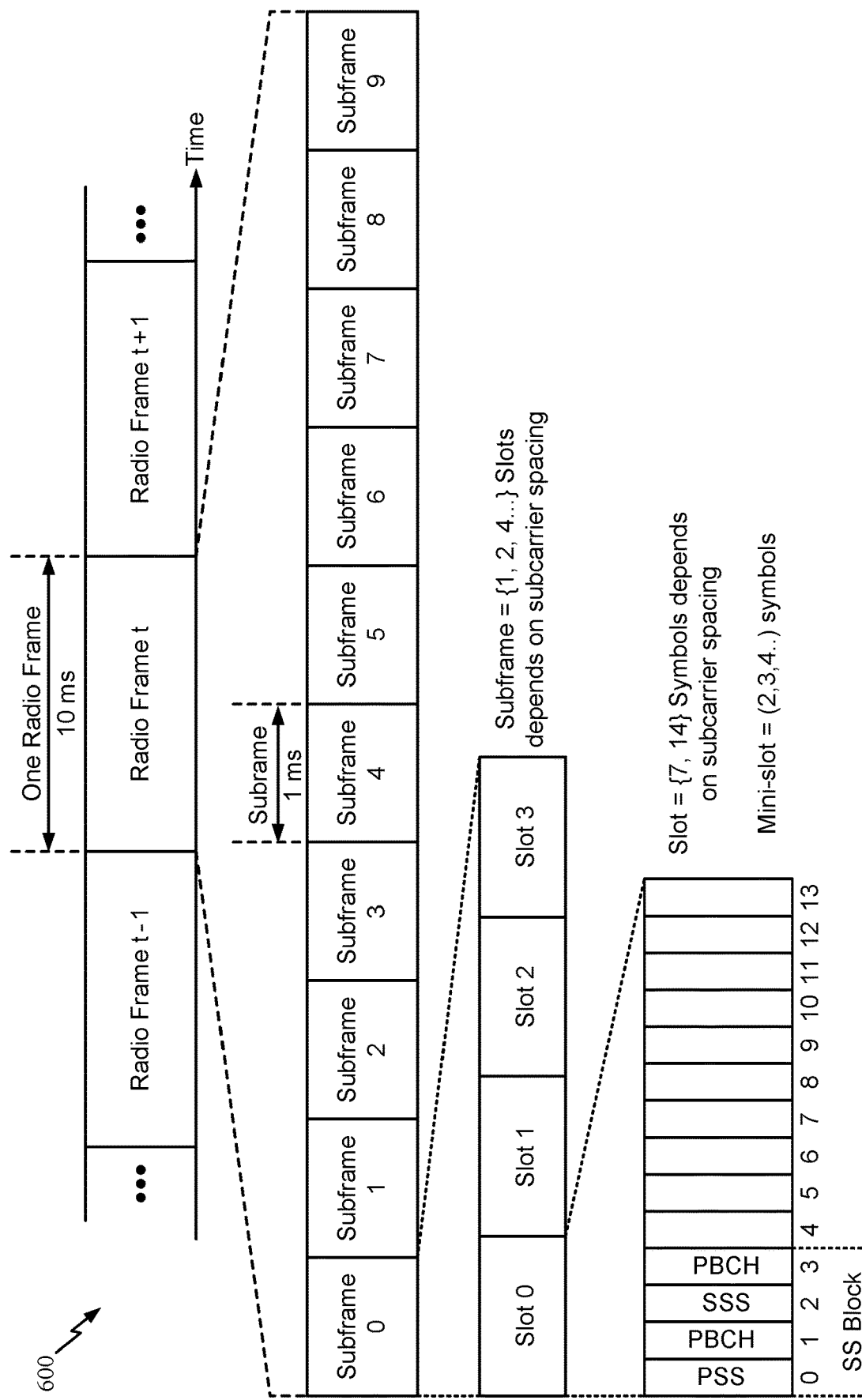
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Radio Resource Control (RRC) States

Figure 7:
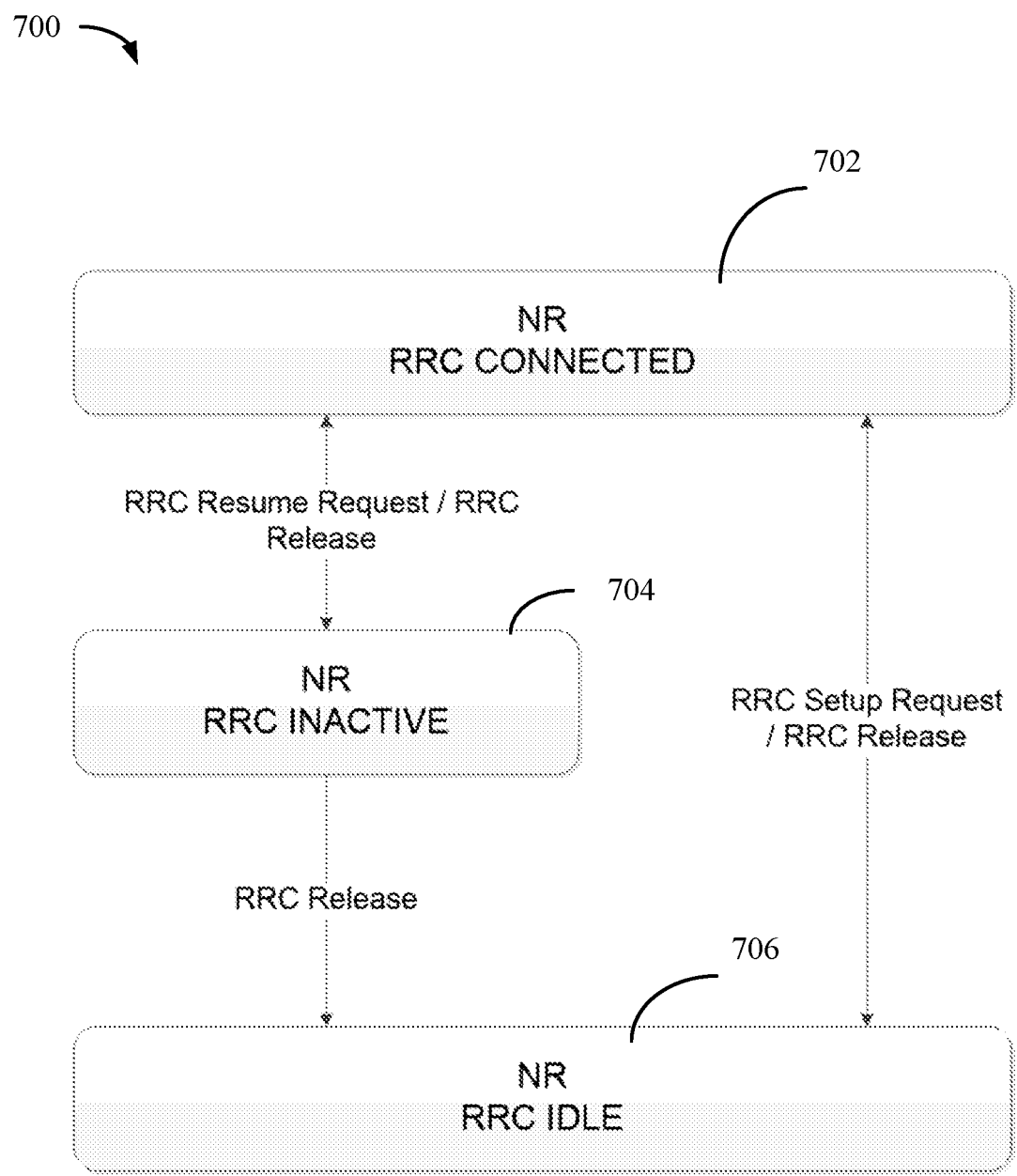
FIG. 7 illustrates different operating states of a UE for NR.

FIG. 7 illustrates different operating states 700 of a UE for NR. As illustrated, a RRC inactive state 704 is included, allowing a UE in RRC connected state 702 to transition to either the RRC inactive state 704 or the RRC idle state 706. In RRC inactive state 704, both the RAN and the UE save the UE context even after UE released from network. Therefore, as long as the UE is in the same RAN notification area (RNA), the UE and RAN can apply the stored UE context allowing the UE to return to RRC connected state 702 with fewer number of signaling operations resulting in a faster transition to the RRC connected state 702. An operator may configure a suitable RNA.

RRC inactive state is a state where the UE access stratum (AS) context is kept at the UE and the anchor next generation (NG) RAN. In RRC inactive state, the core network control plane (N2)/user plane (N3) interfaces are maintained towards the Access and Mobility Management function (AMF) and user plane function (UPF). AMF is a network function that supports termination of non-access stratum (NAS) signaling, NAS ciphering and integrity protection, registration management, connection management, mobility management, access authentication and authorization, and security context management. UPF is a network function that supports packet routing and forwarding, packet inspection, quality of service (QoS) handling, acts as external protocol data unit (PDU) session point of interconnect to data network, and is an anchor point for intra- and inter-radio access technology (RAT) mobility. Moreover, a UE may follow idle mode mobility behavior in RRC inactive state.

Example Techniques for Performing Minimization of Drive Test (MDT)

Minimization of Drive Test (MDT) refers to a feature used to allow operators to improve network planning. For example, MDT operations may be used for user-equipments (UEs) to collect and report measurements to the network. There are two types of MDT operations referred to as immediate MDT and logged MDT. For immediate MDT, measurements are performed by UE in radio resource control (RRC) connected state. The information collected during the connected state is reported to the network upon availability. For logged MDT, measurements are performed and logged by the UEs in a "camped normally" state and "any cell selection" state of idle mode. The UEs may report the collected information for logged MDT to the network at a later point in time as suitable.

In long-term evolution (LTE) MDT operations, RRC inactive state is not implemented. Moreover, there may be no MDT measurement for beam coverage and radio access network (RAN) notification area (RNA) coverage improvement. LTE may not define MDT measurement for cases when there is no global navigation satellite system (GNSS) or neighboring cell radio-frequency (RF) fingerprint. RF fingerprinting is a process that identifies a device from which a radio transmission is originated by looking at the properties of its transmission, including specific radio frequencies. Each signal originator may have a unique RF fingerprint based on the location and configuration of its transmitted signals.

Certain aspects of the present disclosure are directed to MDT operations considering new types of coverage introduced by later generation specific features. For instance, new radio (NR) supports intra-cell beam level mobility (e.g., beam switch without RRC involvement) and introduces new type of beam coverage. Certain aspects of the present disclosure also provide an MDT specific logged measurement configuration with beam coverage, as well as new type of location information acquisition operations for MDT measurement which may be applicable to environments without support for GNSS or neighboring cell RF fingerprint. Certain aspects also provide techniques for performing immediate MDT and logged MDT handling for UE in RRC inactive state.

Figure 8:
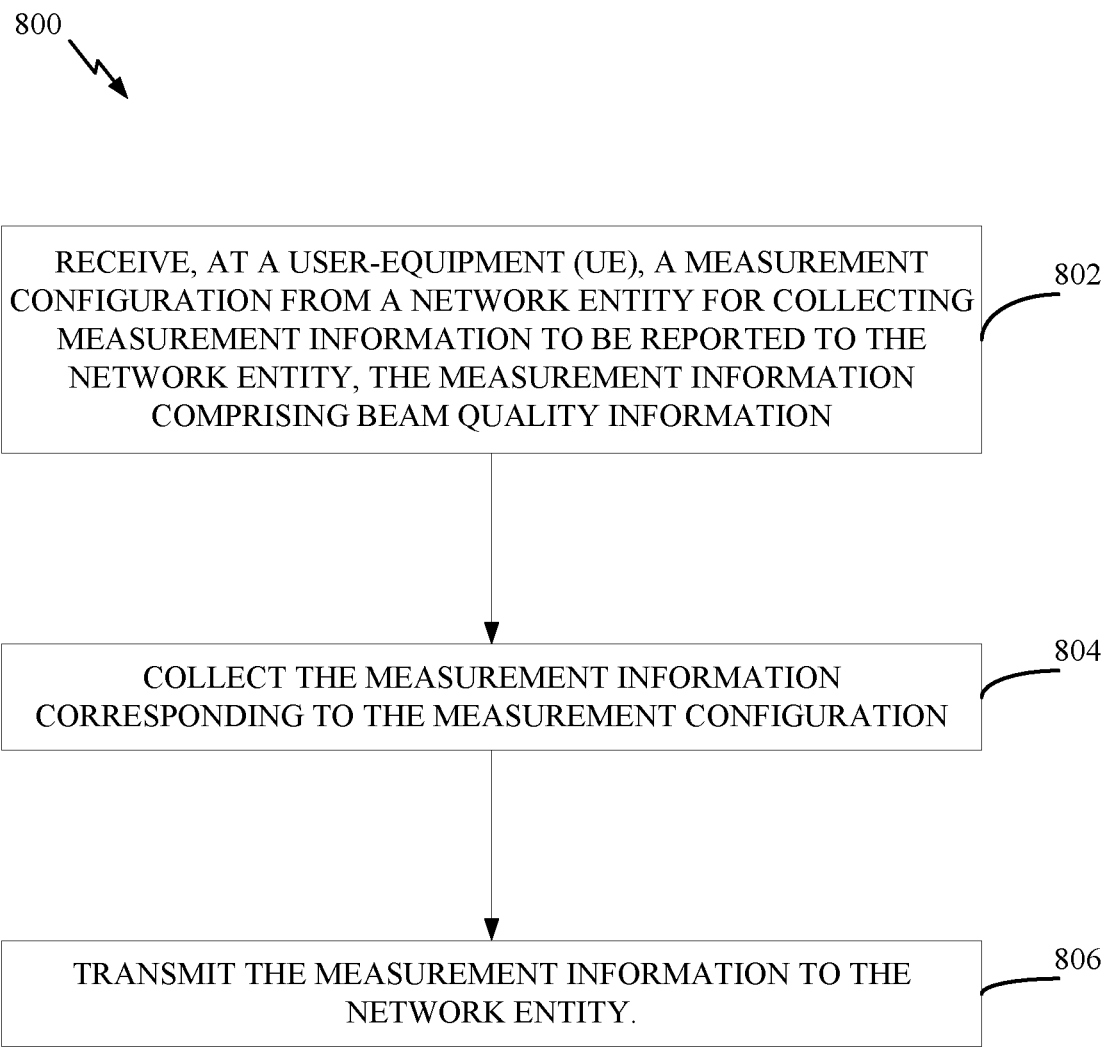
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed by a UE, such as the UE 120.

The operations 800 begin, at block 802, by receiving a measurement configuration from a network entity for collecting measurement information to be reported to the network entity. In certain aspects, the measurement information may include beam quality information and/or information regarding distribution of serving cells. At block 804, the UE collects the measurement information corresponding to the measurement configuration, and at block 806, transmits the measurement information to the network entity.

Figure 9:
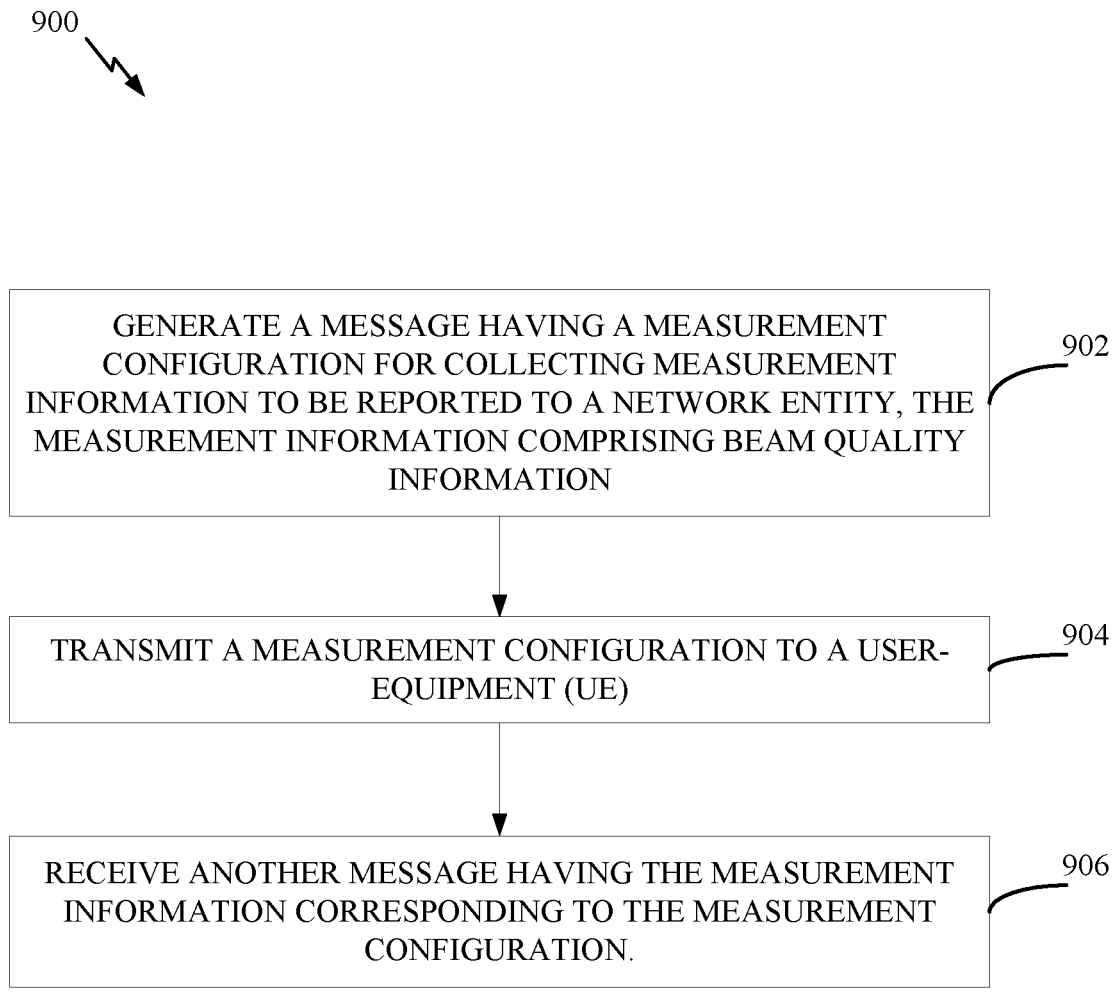
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed by a network entity, such as the base station 110 or a radio access network.

Operations 900 may be implemented as software components that are executed and run on one or more processors (e.g., controller/processor 440 of FIG. 4). Further, the transmission and reception of signals by the BS in operations 900 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 900 begin, at block 902, with the base station generating a message having a measurement configuration for collecting measurement information to be reported to a network entity. In certain aspects, the measurement information may include beam quality information and/or information regarding distribution of serving cells. At block 904, the base stations transmits the measurement configuration to a UE (e.g., UE 120), and at block 906, receives another message having the measurement information corresponding to the measurement configuration.

In other words, MDT specific idle mode measurement may be used to collect information regarding beam quality and distribution of serving cells. In some cases, the operations described herein may also involve configuring a UE to log downlink pilot strength measurements. In some cases, the measurement configuration may specify which type of reference signal (e.g., synchronization signal (SS) or channel state information-reference signal (CSI-RS)) is to be used when performing radio resource measurements (RRM).

In certain aspects, the measurement configuration may also indicate to the UE whether to perform cell level measurement (e.g., reuse idle mode measurement), or beam level measurement with MDT specific parameters. For beam level measurement, the UE may be indicated L3 beam measurement information to be used such as beam number or beam index, or both beam index and beam quantities.

The UE may also be indicated via the measurement configuration a threshold that triggers beam reporting, and a beam number for L3 beam reporting. The measurement configuration may also indicate whether reference signal received power (RSRP) or reference signal received quality (RSRQ) is to be used for the measurements.

The measurement configuration may also indicate to the UE a beam valid duration indicating how long measured beam quality information remains valid. For example, the UE may store a measured beam quality, and upon expiration of a beam valid timer (e.g. corresponding to the indicated beam valid duration), the measurement results may be considered invalid, and as a result, discarded by the UE. The UE may also be indicated an interval for logging beam quality measurements, which may be adjusted based on the communication environment.

In legacy MDT, location information is obtained by satellite (e.g., GNSS or BeiDou navigation satellite system (BDS)). The reporting may include indications of latitude and longitude corresponding to a location of the UE. Location information may also be obtained by the UE using neighbour cell measurements to determine the UE location (e.g., via RF fingerprint as described herein). However, cell coverage and GNSS may not always be available. Legacy logged MDT works when a UE is camped normally on a cell (e.g., in a "camped normally" state) and is in a state where the UE is attempting to find any acceptable cell (e.g., is in an "any cell selection" state). This also means that the location information is available either via GNSS or neighbouring cell RF fingerprint. When the UE enters an out of coverage area (e.g., an out of coverage (OOC) cell) without any location information availability, the UE may be unable to report the location of the coverage hole. Certain aspects of the present disclosure are generally directed to techniques for performing MDT without GNSS or neighboring cell RF fingerprint.

Figure 10:
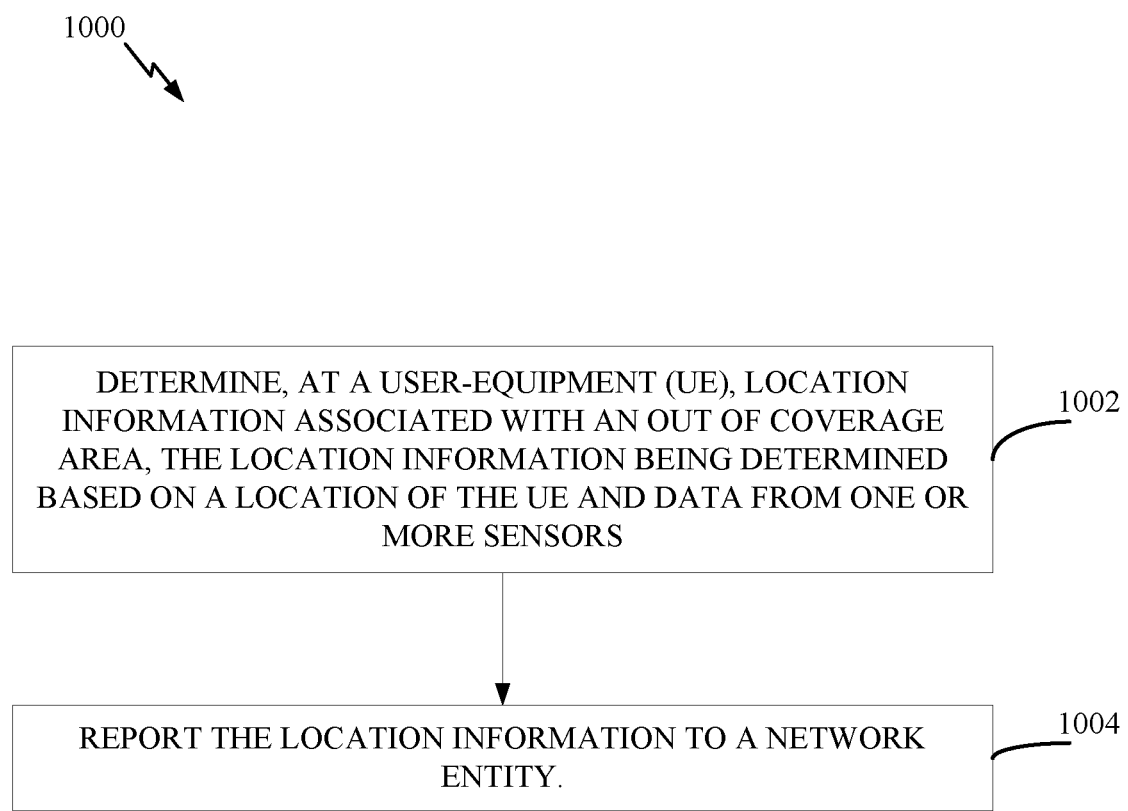
FIG. 10 is a flow diagram illustrating example operations for wireless communication, in accordance with certain aspects of the present disclosure.

FIG. 10 is a flow diagram illustrating example operations 1000 for wireless communication, in accordance with certain aspects of the present disclosure. The operations 1000 may be performed by a UE, such as the UE 120.

Operations 1000 may be implemented as software components that are executed and run on one or more processors (e.g., controller/processor 480 of FIG. 4). Further, the transmission and reception of signals by the UE in operations 1000 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 1000 begin, at block 1002, with the UE determining location information associated with an out of coverage area (e.g., an area without an available satellite positioning system or cell coverage). In certain aspects, the location information may be determined based on a location (e.g., a location having an available satellite positioning system or cell coverage) of the UE and data from one or more sensors. At block 1004, the UE reports the location information to a network entity.

In other words, information from internal sensors of a UE, such as a gyroscope and compass, may be used by the UE to determine direction, distance, altitude, and velocity. For example, the location information may be determined by calculating a relative location associated with the out of coverage area with respect to the location of the UE via the data from the one or more sensors. With sensor based location information acquisition, the UE may calculate its relative mobility track with respect to a normal cell after the UE enters the normal cell, and reports that coverage hole with sensor based location information (e.g., distance, direction, altitude, velocity), as described in more detail with respect to FIG. 11.

Figure 11:
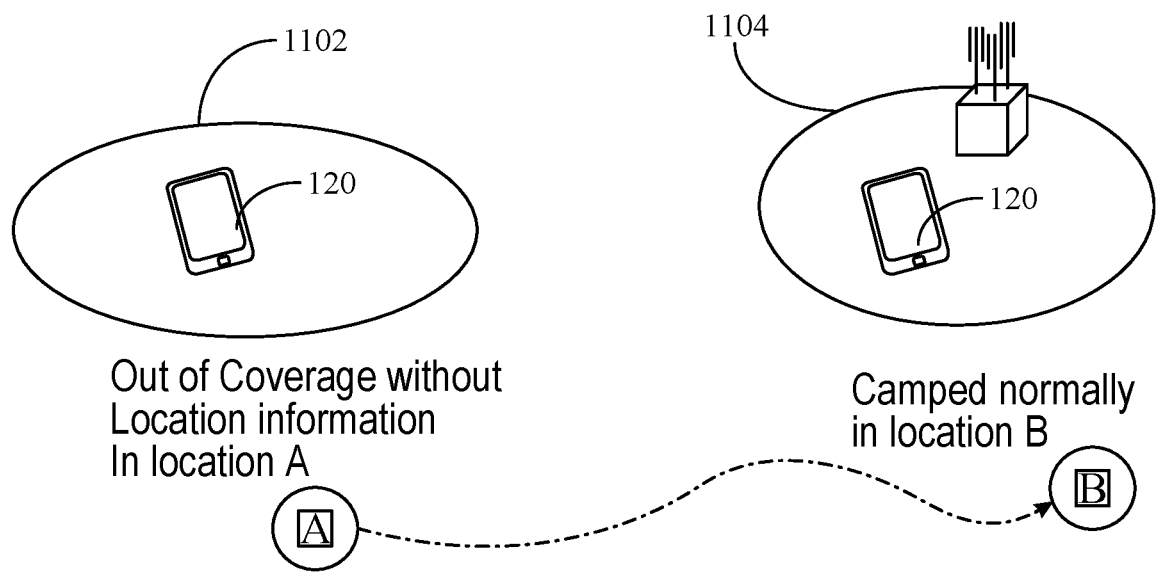
FIG. 11 illustrates a UE tracking a relative location of an out of coverage area, in accordance with certain aspects of the present disclosure.

FIG. 11 illustrates a UE 120 tracking a relative location of an out of coverage area, in accordance with certain aspects of the present disclosure. As illustrated, the UE may be at location A which is in an OOC cell 1102 without any GNSS or neighboring cell RF fingerprint available. Thus, the UE may trigger the acquisition of sensor based location information, as described herein. For example, the UE 120 may record movement direction, velocity, distance, and corresponding time stamps, until the UE is at location B in cell 1104 where the UE is in a camped normally state. Then the UE may calculate the relative location of location A with respect to location B and logs that measurement result for reporting to the network.

As described herein with respect to FIG. 7, NR introduces an RRC inactive state between connected and idle states. Certain aspects of the present disclosure are directed to techniques for performing immediate MDT and logged MDT handling for UE in the RRC inactive state.

An access and mobility management function (AMF) network entity may or may not subscribe to the RAN to request RRC inactive state transition report upon entering or leaving RRC inactive state from/to RRC connected state. Immediate MDT is applicable to RRC connected mode UE, and not applicable to RRC inactive mode UE since immediate MDT is used to measure on-going service (e.g., quality of service (QoS) verification, data volume measurement, scheduled IP throughput, received interference power by RAN). Certain aspects of the present disclosure are directed to a UE state aware AMF for triggering a proper MDT protocol.

Figure 12:
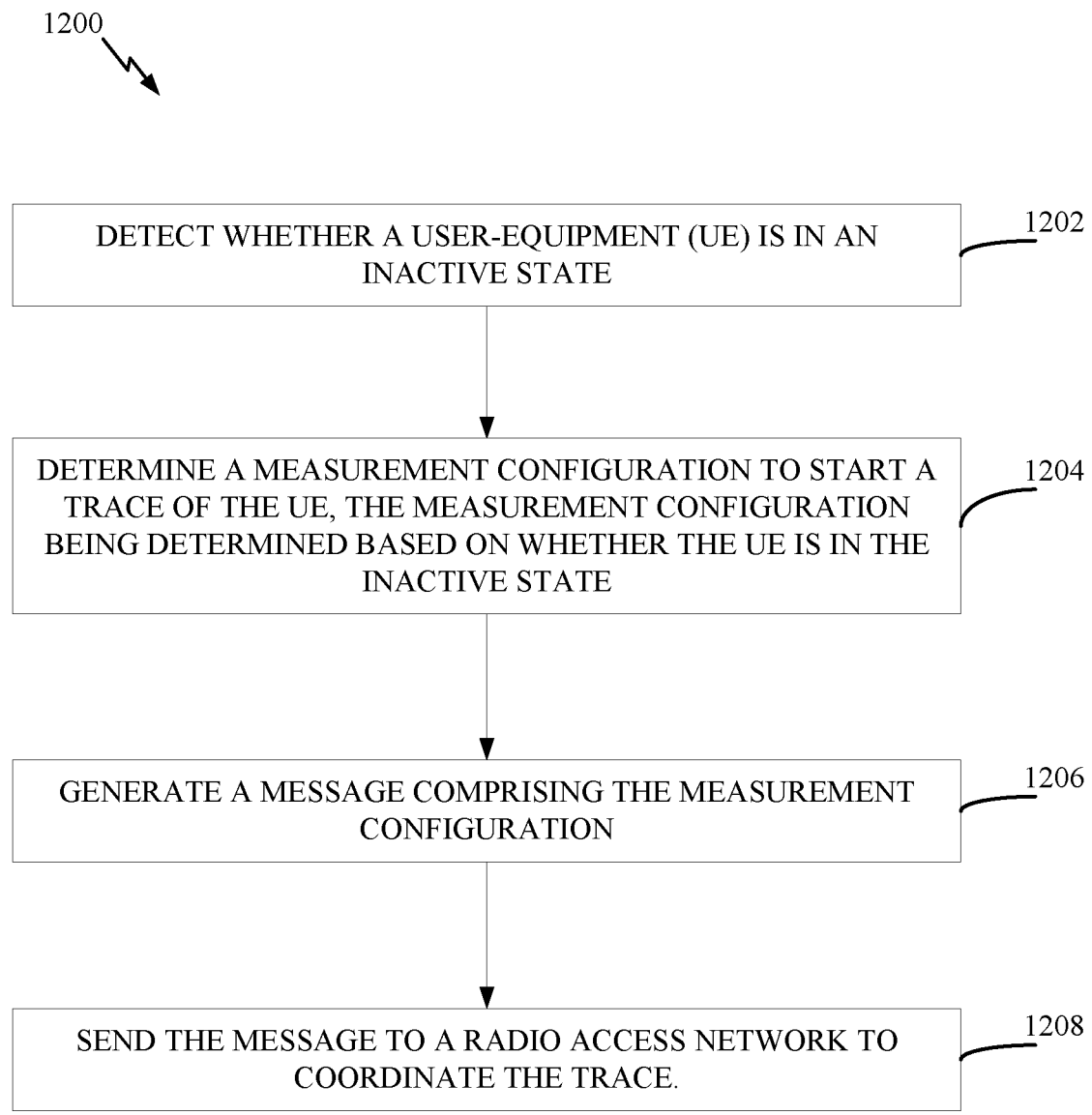
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed by an AMF.

The operations 1200 begin, at block 1202, with the AMF detecting whether a UE is in an inactive state. At block 1204, the AMF determines a measurement configuration to start a trace of the UE, the measurement configuration being determined based on whether the UE is in the inactive state, and at block 1206, generates a message comprising the measurement configuration. At block 1208, the AMF sends the message to a radio access network to coordinate the trace. In other words, if the AMF is aware of a UE transition to RRC inactive state, the AMF may be configured to properly trigger the correct type of MDT measurement. For instance, the AMF may not trigger immediate MDT for UE in RRC inactive mode.

Certain aspects of the present disclosure are directed to an AMF that may be unaware of a UE transition to RRC inactive state. In this case, the RAN may be responsible for handling of an MDT (e.g., immediate MDT) that may be triggered by the AMF for a UE in RRC inactive mode.

Figure 13:
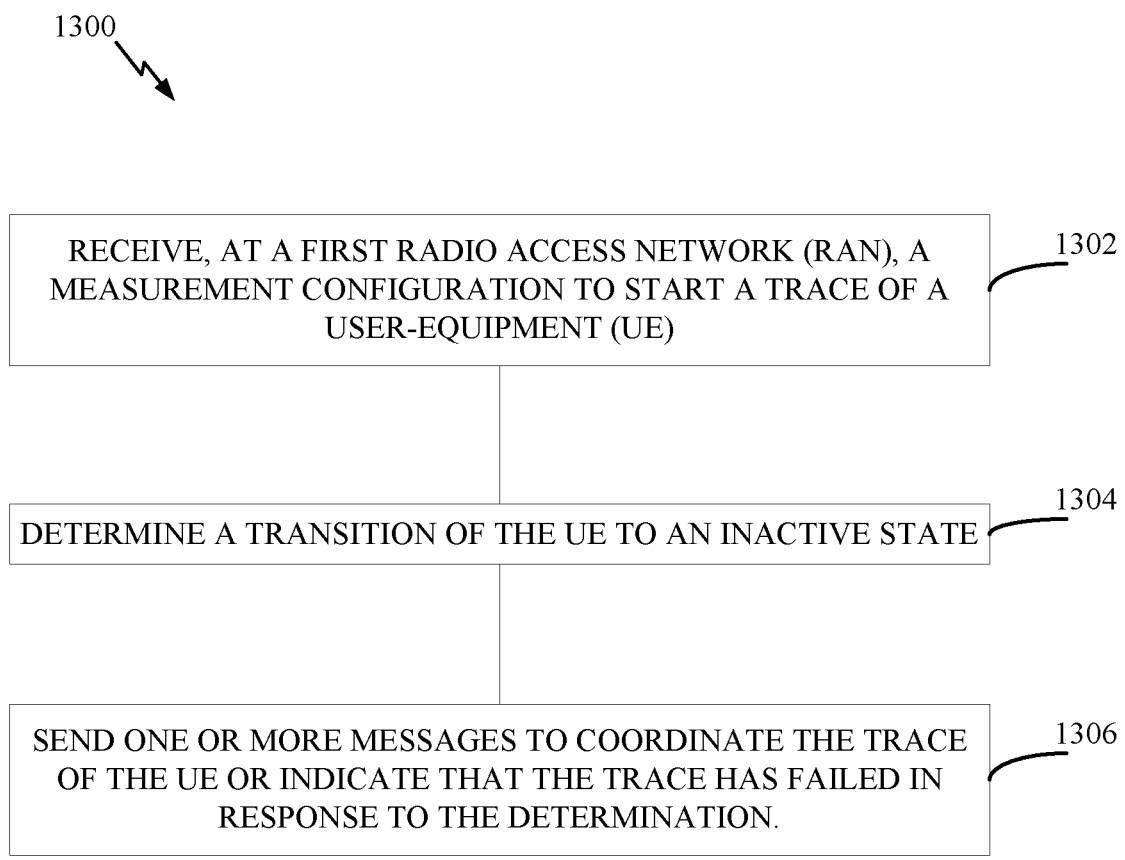
FIG. 13 is a flow diagram illustrating example operations for wireless communication, in accordance with certain aspects of the present disclosure.

FIG. 13 is a flow diagram illustrating example operations 1300 for wireless communication, in accordance with certain aspects of the present disclosure. The operations 1300 may be performed a network entity, such as a RAN (e.g., anchor RAN).

The operations 1300 begin, at block 1302, by the RAN receiving a measurement configuration to start a trace of a user-equipment (UE). At block 1304, the RAN determines a transition of the UE to an inactive state, and at block 1306, sends one or more messages to coordinate the trace of the UE or indicate that the trace has failed in response to the determination. For example, a trace failure indication may be sent to the AMF from the NG-RAN if immediate MDT is triggered for an RRC inactive mode UE.

In certain aspect of the present disclosure, the RAN may handle a logged MDT triggered by the AMF for an RRC inactive state UE via a new serving RAN of the UE. For example, the logged MDT may be configured immediately with RAN paging. For instance, an anchor RAN may send a RAN paging message to a new serving RAN of the UE to trigger the UE to enter RRC connected state. In another aspect, the logged MDT may be deferred until the UE enters a connected state via an RRC resume request to the new serving RAN, as described in more detail herein.

Figure 14:
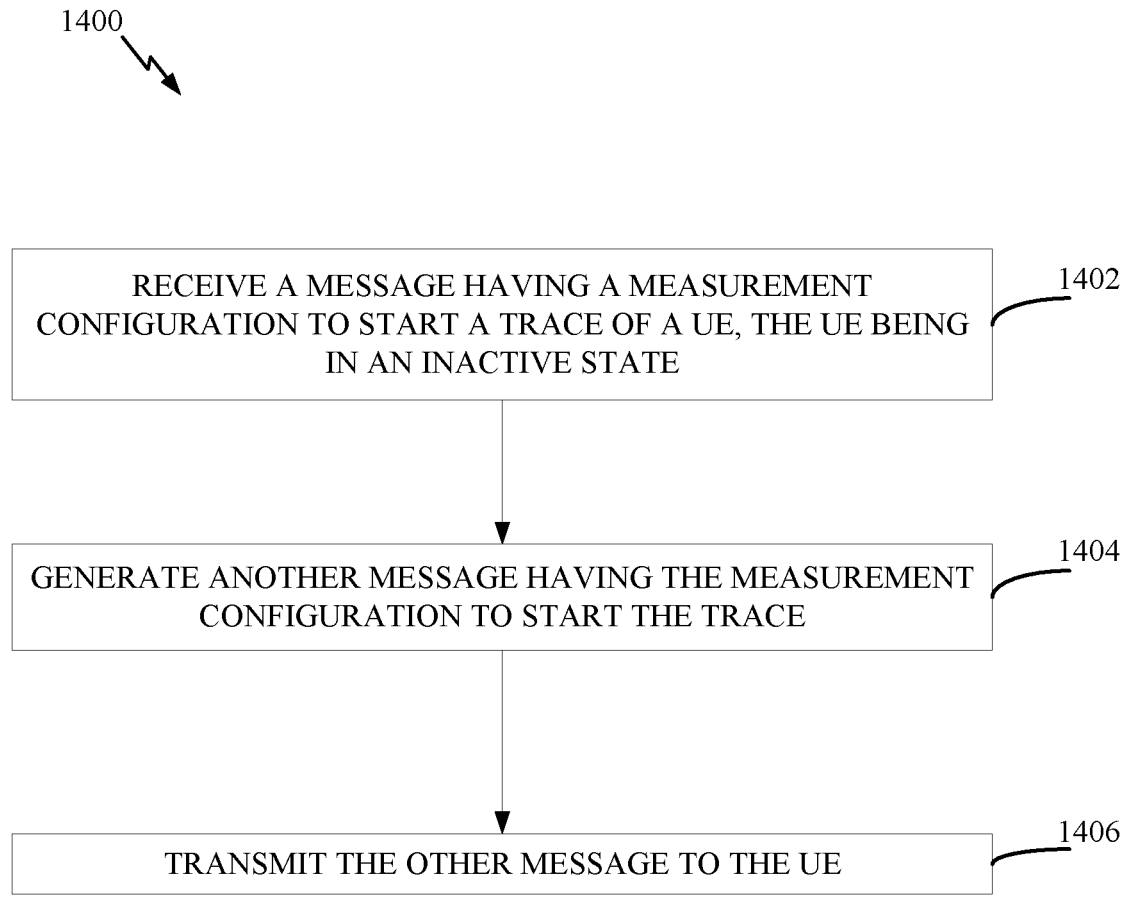
FIG. 14 is a flow diagram illustrating example operations for wireless communication, in accordance with certain aspects of the present disclosure.

FIG. 14 is a flow diagram illustrating example operations 1400 for wireless communication, in accordance with certain aspects of the present disclosure. The operations 1400 may be performed by a RAN (e.g., serving RAN of a UE).

The operations 1400 begin, at block 1402, with the RAN receiving a message having a measurement configuration to start a trace of a UE, the UE being in an inactive state. At block 1404, the RAN may generate another message having the measurement configuration to start the trace, and at block 1406, transmit the other message to the UE.

In certain aspects, the message having the measurement configuration may be a trace start message from an AMF network entity. In this case, the new serving RAN may send a path switch request to the AMF prior to receiving the trace start message. In another aspects, the operations 1400 may include the RAN sending a UE context request message to another RAN (e.g., anchor RAN), where the message having the measurement configuration is a UE context response message received after the UE context request message is sent. In this case, the operations 1400 also include transmitting a radio resource control (RRC) resume message to the UE after receiving the UE context response message, as described in more detail herein.

Figure 15:
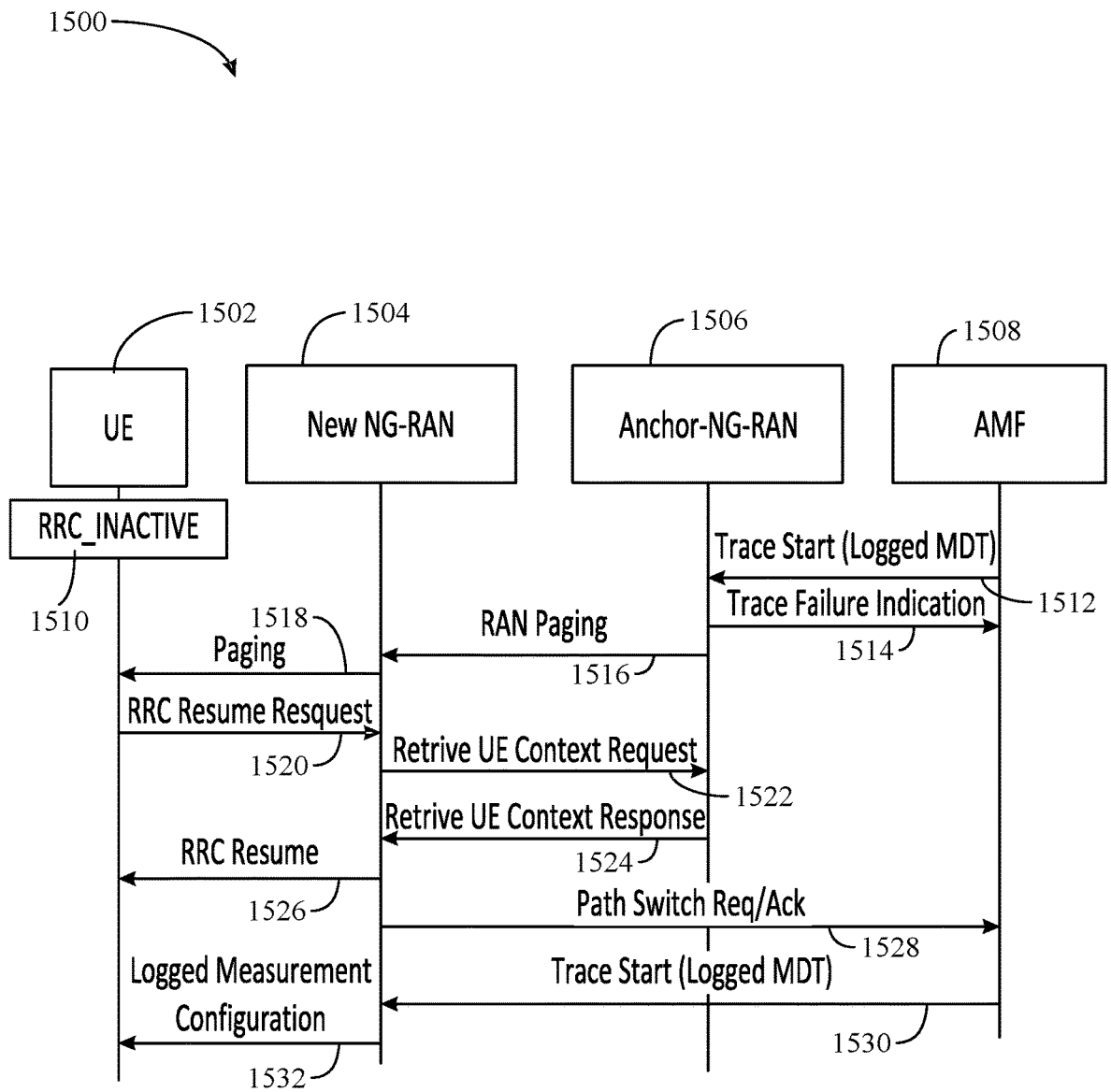
FIG. 15 illustrates example operations for coordinating a logged minimization of drive test (MDT) trace for an inactive state UE with a trace failure indication, in accordance with certain aspects of the present disclosure.

In certain aspects, an indication may be sent to the AMF that a logged MDT trace has failed and to re-try the trace for logged MDT in a new serving NG-RAN after context retrieval, as described in more detail with respect to FIG. 15.

FIG. 15 illustrates example operations 1500 for coordinating a logged MDT trace for an inactive state UE with a trace failure indication, in accordance with certain aspects of the present disclosure. At block 1510, the UE may enter an RRC inactive state. As illustrated, after the anchor RAN 1506 receives a trace start message 1512 from the AMF, the anchor RAN 1506 determines that that the UE is in an inactive state and sends a trace failure indication 1514 to the AMF entity 1508, indicating that the trace has failed since the UE 1502 is in an inactive state. The anchor RAN 1506 then sends a RAN paging message 1516 to the new serving RAN 1504 of the UE 1502, triggering an RRC connection protocol for the UE 1502 to enter an RRC connected state. For example, the new serving RAN 1504 may transmit a paging message 1518 to the UE 1502, and receive a RRC resume request 1520 from the UE 1502.

The new serving RAN 1504 may then retrieve the UE context from the anchor RAN 1506 by sending a retrieve UE context request message 1522 to the anchor RAN 1506 and receive a UE context response 1524 having the context of the UE 1502. The new serving RAN 1504 may then transmit an RRC resume message 1526 to the UE 1502 and send a path switch request 1528 to the AMF 1508. The AMF 1508 may retry the trace for logged MDT by sending another trace start message 1530 (e.g., having the measurement configuration) for logged MDT to the new serving RAN 1504, in response to which the new serving RAN 1504 transmits a logged measurement configuration message 1532 to the UE 1502, configuring the UE to perform the logged MDT.

Figure 16:
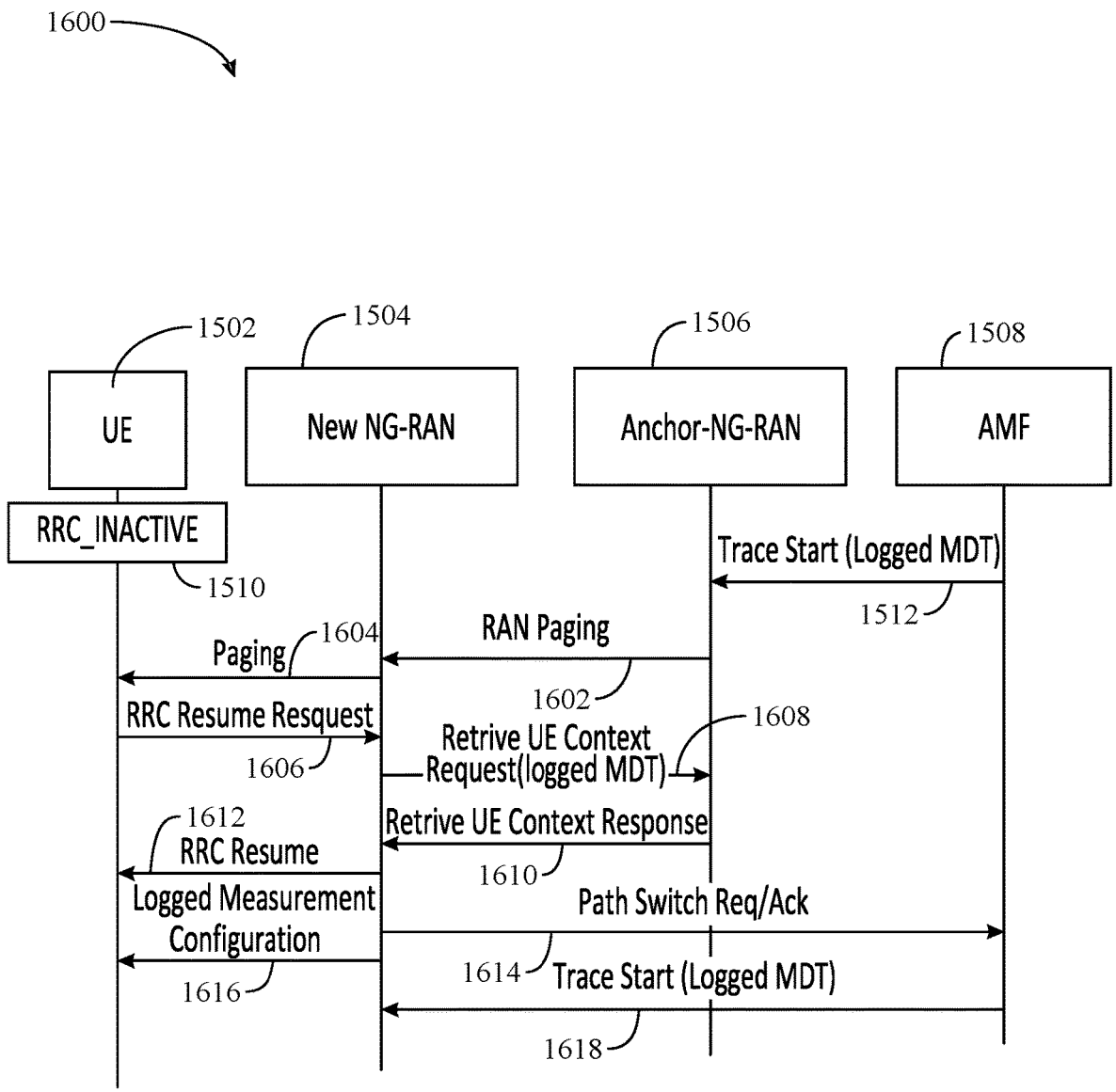
FIG. 16 illustrates example operations for coordinating a logged MDT trace for an inactive state UE, in accordance with certain aspects of the present disclosure.

FIG. 16 illustrates example operations 1600 for coordinating a logged MDT trace for an inactive state UE, in accordance with certain aspects of the present disclosure. In this case, the trace for logged MDT is transferred to the new serving RAN 1504 with an Xn context retrieval procedure. For example, after the anchor RAN 1506 receives the trace start message 1512, the anchor RAN 1506 may cache the MDT configuration and send a RAN paging message 1602 to the new serving RAN 1504 of the UE 1502, triggering an RRC connection protocol for the UE 1502 to enter an RRC connected state. For example, the new serving RAN 1504 may transmit a paging message 1604 to the UE 1502, and receive a RRC resume request 1606 from the UE 1502.

The new serving RAN 1504 may then retrieve the UE context from the anchor RAN 1506 by sending a retrieve UE context request message 1608 to the anchor RAN 1506. The new serving RAN 1504 may receive a UE context response 1610 having the context of the UE 1502. In this case, the UE context response 1610 may also indicate the measurement configuration for the trace to the new serving RAN 1504. The new serving RAN 1504 may then transmit a RRC resume message 1612 to the UE 1502 and send a path switch request 1614 to the AMF entity 1508. The new serving RAN 1504 then transmits a logged measurement configuration message 1616 to the UE, configuring the UE to perform the logged MDT. In certain aspects, the AMF entity may send another trace start message 1618 for logged MDT to the new serving RAN 1504.

Figure 17:
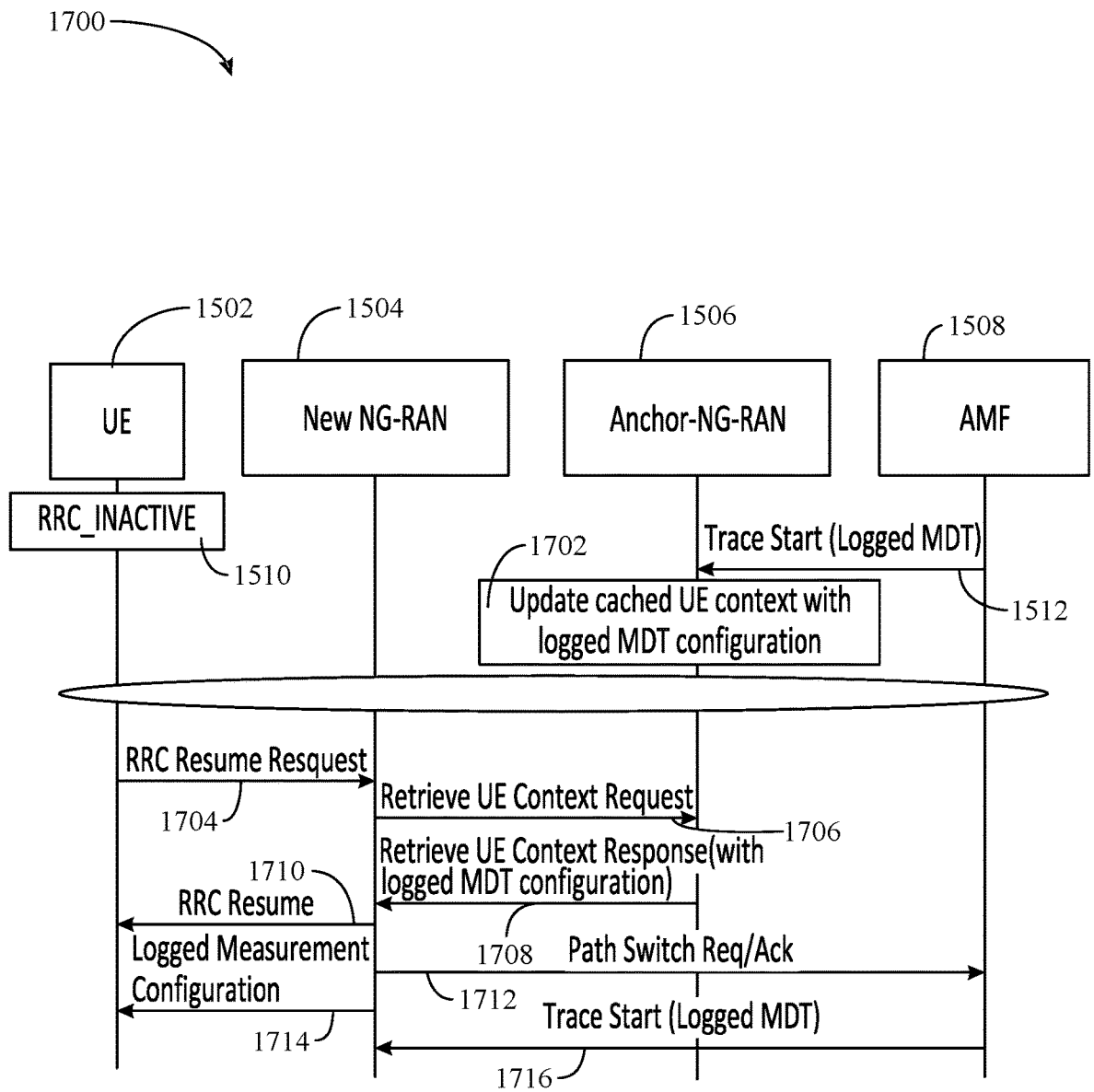
FIG. 17 illustrates example operations for deferring a logged MDT trace, in accordance with certain aspects of the present disclosure.

FIG. 17 illustrates example operations 1700 for deferring a logged MDT trace, in accordance with certain aspects of the present disclosure. In this case, logged MDT is delayed for configuration until the UE resumes at a later point in time. The MDT context is transferred to new serving RAN 1504 with a context retrieval procedure once the UE resumes. In certain aspects, the AMF may indicate whether delay of the logged MDT trigger is allowed. In other aspects, whether to delay the logged MDT trigger is determined by the RAN based on UE context.

As illustrated, once the anchor RAN 1506 receives the trace start message 1512 from the AMF entity 1508, the anchor RAN 1506 updates previously cached UE context with the new logged MDT configuration at block 1702. The anchor RAN 1506 then awaits UE transition to connected state. For example, the UE 1502 may send an RRC resume request 1704 to the new serving RAN 1504, as illustrated. The new serving RAN 1504 then sends a UE context request 1706 to the anchor RAN 1506 and receives the UE context response 1708 having the logged MDT configuration previously cached by the anchor RAN 1506. Then new serving RAN 1504 then sends an RRC resume message 1710 to the UE 1502, followed by a path switch request 1712 to the AMF entity 1508. The new serving RAN 1504 also sends a logged measurement configuration 1714 to the UE, configuring the UE to perform the logged MDT. In certain aspects, the AMF entity may send another trace start message 1716 for logged MDT to the new serving RAN 1504.

Certain aspects provide techniques for handling of ongoing MDT measurement (e.g. immediate MDT) when a UE enters an RRC inactive state. For example, once a UE is configured with immediate MDT enters RRC inactive state, the RAN may indicate to the AMF that the trace is deactivated due to the state transition of the UE to the RRC inactive state and release the immediate MDT configuration.

In other aspects, the RAN may suspend the immediate MDT configuration, and cache the MDT configuration in UE context. The MDT configuration may be transferred to the new serving RAN of the UE. Once the UE resumes (e.g., enters connected state), the configured immediate MDT may be resumed by the new serving RAN.

In certain aspects, the RAN may not do anything if the UE transitions to the RRC inactive state. In other words, there may be no MDT measurement during RRC inactive state, and it may be left up to the new serving RAN whether to resume the immediate MDT when the UE enters RRC connected state.

Certain aspects of the present disclosure are directed to operations for a scenario where a UE that is configured with logged MDT enters RRC inactive state. For example, the logged MDT may be considered as valid within the area scope configured by the AMF in MDT configuration.

In some cases, the logged MDT may be conditionally valid only within the overlapped area scope of the configured area scope by the AMF and the configured UE RAN-based notification area (RNA) list (e.g., list of cells defining the RNA) by the RAN. In other words, a UE may be configured with an RNA, and according to the RNA, the UE may notify the RAN if the UE moves from one RNA to another. In otherwords, the RNA corresponds to the granularity at which the RAN is indicated and knows the location of the UE. In some cases, the RNA may be configured by RAN to a UE when the UE enters RRC inactive state. Thus, only the RAN and the UE may be aware of the RNA. The RAN may initiate logged MDT configuration for the UE when the UE enters RRC inactive state with the RRC release message if the UE is within the RNA. In other words, the RRC release message sent by the RAN to the UE to transition the UE to the RRC inactive state may also include the logged MDT configuration. The UE may perform the logged MDT while within the RNA list. The RNA specific MDT configuration may be invalid if the UE enters RRC idle mode. This protocol may be used to collect RNA specific radio signal environment information.

Figure 18:
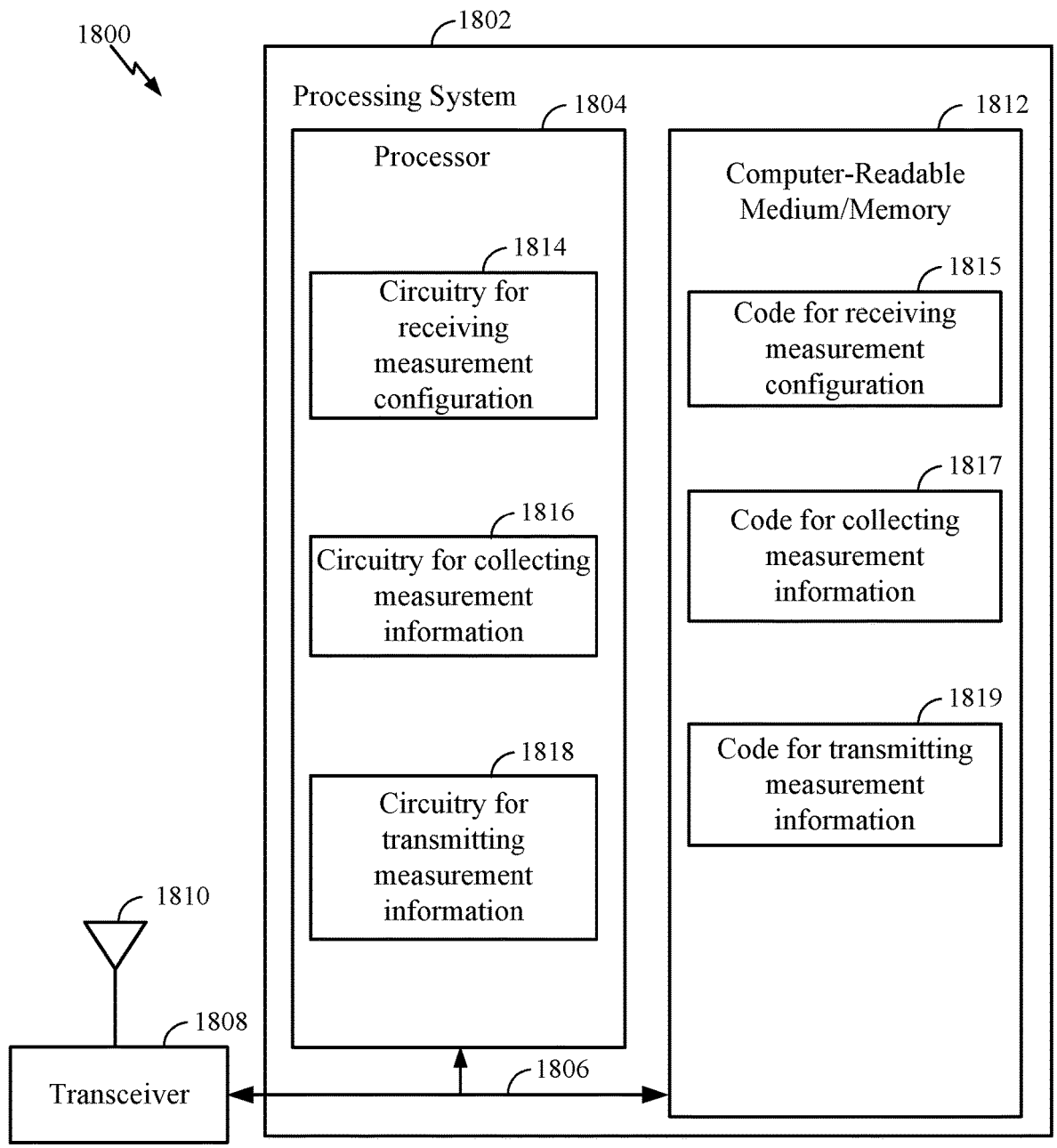
FIGS. 18-23 illustrate communications devices that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 8. The communications device 1800 includes a processing system 1802 coupled to a transceiver 1808. The transceiver 1808 is configured to transmit and receive signals for the communications device 1800 via an antenna 1810, such as the various signals or messages as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer executable code) that when executed by the processor 1804, cause the processor 1804 to perform the operations described herein, or other operations for performing the various techniques discussed herein with respect to FIG. 8. In certain aspects, computer-readable medium/memory 1812 stores code 1815 for receiving measurement configuration, code 1817 for collecting measurement information, and code 1819 for transmitting measurement information. In certain aspects, the processor 1804 has circuitry configured to implement the code stored in the computer-readable medium/memory 1812. The processor 1804 may include circuitry 1814 for receiving measurement configuration, circuitry 1816 for collecting measurement information, and circuitry 1818 for transmitting measurement information.

Figure 19:
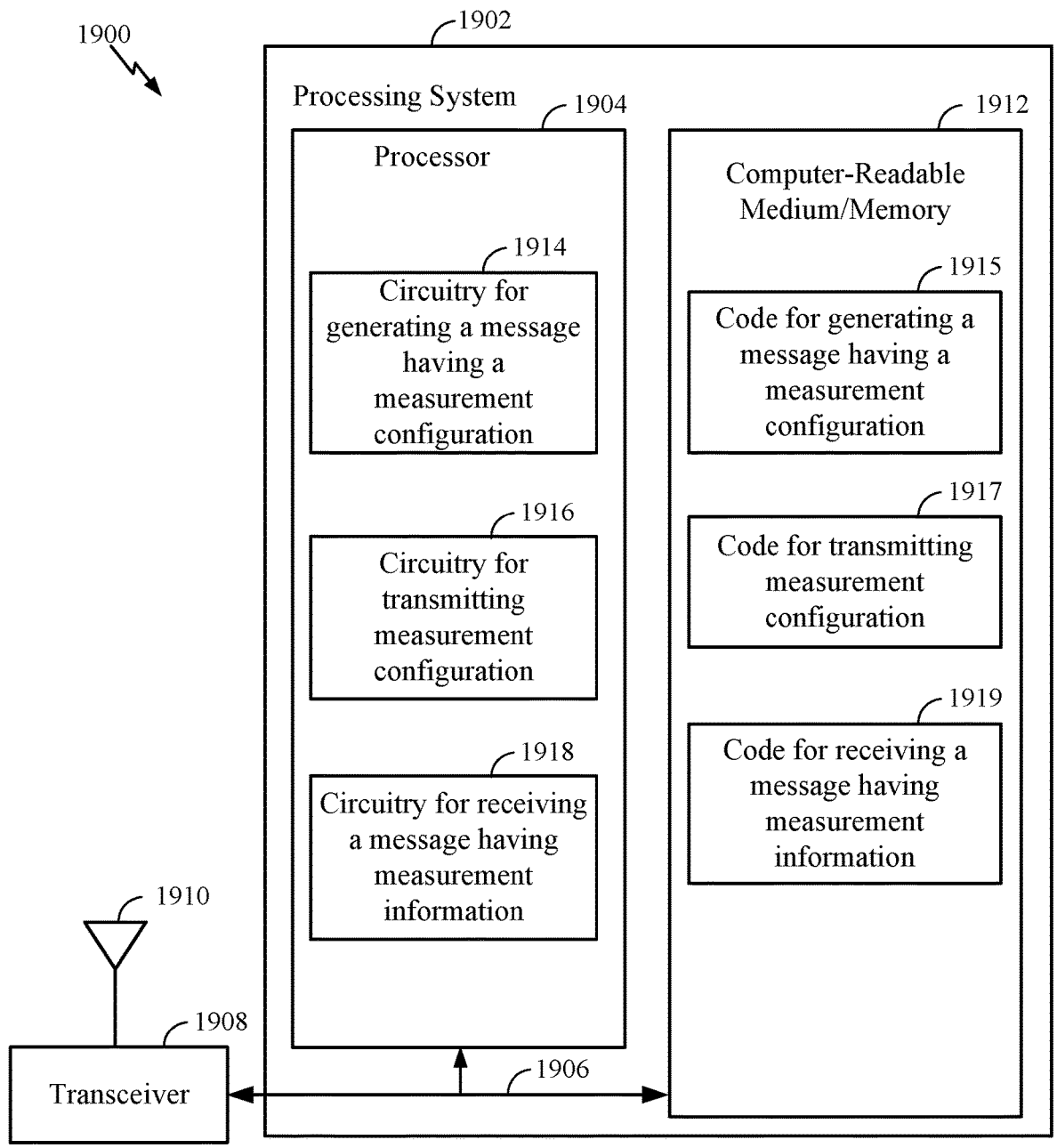

FIG. 19 illustrates a communications device 1900 that may include various components (e.g., corresponding to means-plus-function components) configured to perform operations for the techniques disclosed herein, such as the operations illustrated in FIG. 9. The communications device 1900 includes a processing system 1902 coupled to a transceiver 1908. The transceiver 1908 is configured to transmit and receive signals for the communications device 1900 via an antenna 1910, such as the various signals or messages as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer executable code) that when executed by the processor 1904, cause the processor 1904 to perform the operations described herein, or other operations for performing the various techniques discussed herein with respect to FIG. 9. In certain aspects, computer-readable medium/memory 1912 stores code 1915 for generating a message having a measurement configuration, code 1917 for transmitting measurement configuration, and code 1919 for receiving a message having measurement information. In certain aspects, the processor 1904 has circuitry configured to implement the code stored in the computer-readable medium/memory 1912. The processor 1904 may include circuitry 1914 for generating a message having a measurement configuration, circuitry 1916 for transmitting measurement configuration, and circuitry 1918 for receiving a message having measurement information.

Figure 20:
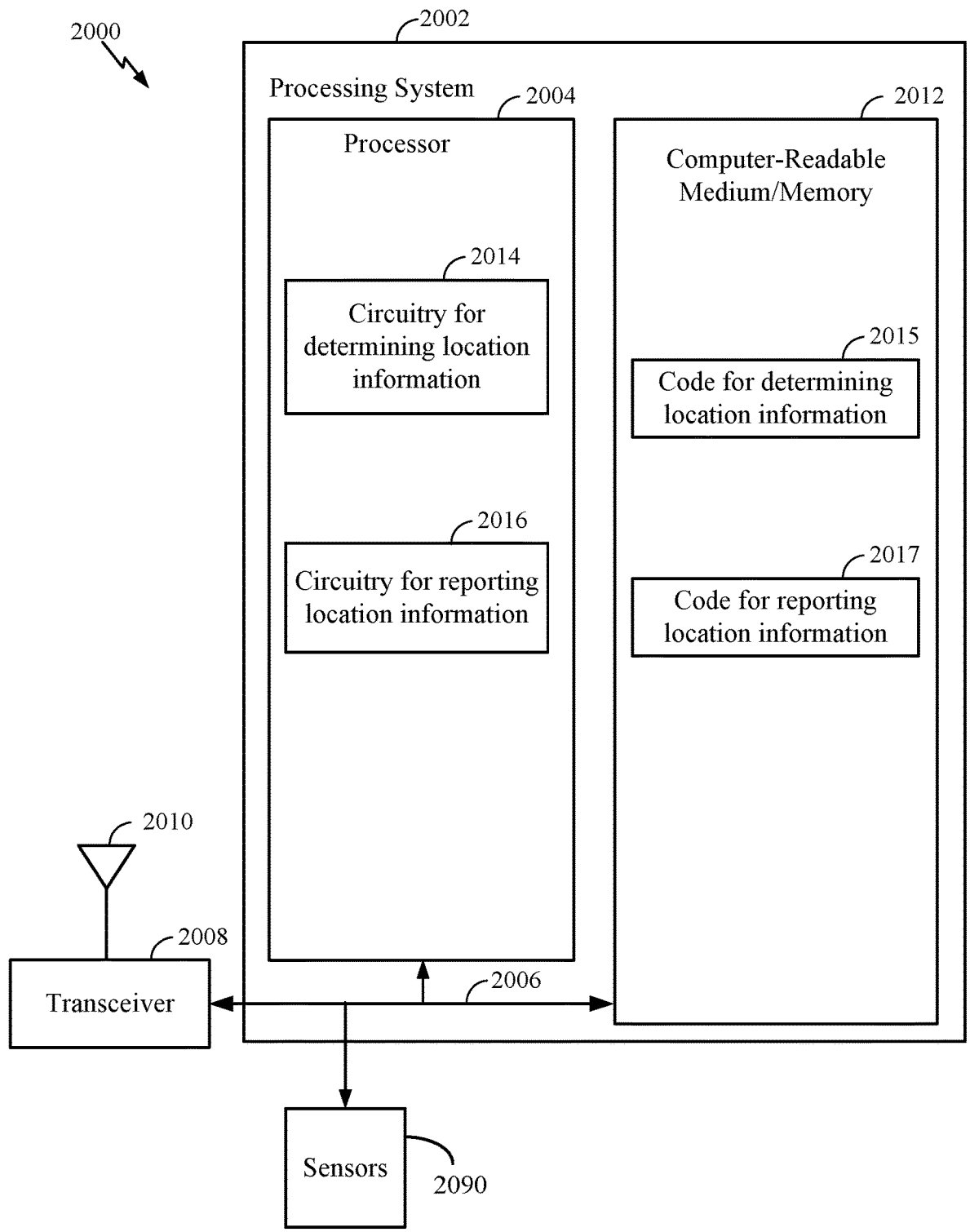

FIG. 20 illustrates a communications device 2000 that may include various components (e.g., corresponding to means-plus-function components) configured to perform operations for the techniques disclosed herein, such as the operations illustrated in FIG. 10. The communications device 2000 includes a processing system 2002 coupled to a transceiver 2008. The transceiver 2008 is configured to transmit and receive signals for the communications device 2000 via an antenna 2010, such as the various signals or messages as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer executable code) that when executed by the processor 2004, cause the processor 2004 to perform the operations described herein, or other operations for performing the various techniques discussed herein with respect to FIG. 10. In certain aspects, computer-readable medium/memory 2012 stores code 2015 for determining location information (e.g., via sensors 2090), and code 2017 for reporting location information. In certain aspects, the processor 2004 has circuitry configured to implement the code stored in the computer-readable medium/memory 2012. The processor 2004 may include circuitry 2014 for determining location information, and circuitry 2016 for reporting location information.

Figure 21:
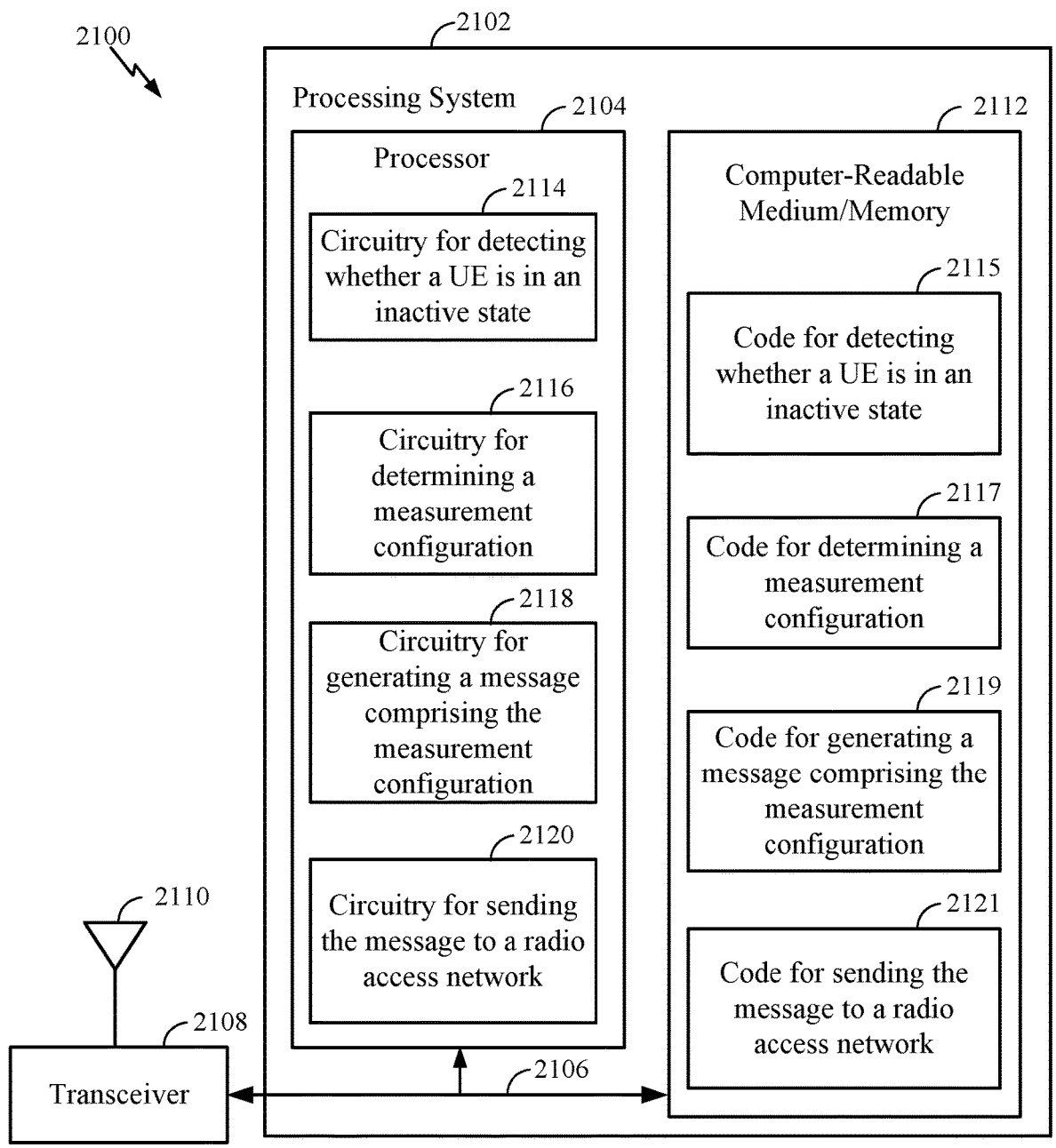

FIG. 21 illustrates a communications device 2100 that may include various components (e.g., corresponding to means-plus-function components) configured to perform operations for the techniques disclosed herein, such as the operations illustrated in FIG. 12. The communications device 2100 includes a processing system 2102 coupled to a transceiver 2108. The transceiver 2108 is configured to transmit and receive signals for the communications device 2100 via an antenna 2110, such as the various signals or messages as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer executable code) that when executed by the processor 2104, cause the processor 2104 to perform the operations described herein, or other operations for performing the various techniques discussed herein with respect to FIG. 12. In certain aspects, computer-readable medium/memory 2112 stores code 2115 for detecting whether a UE is in an inactive state, code 2117 for determining a measurement configuration, code 2119 for generating a message comprising the measurement configuration, and code 2121 for sending the message to a radio access network. In certain aspects, the processor 2104 has circuitry configured to implement the code stored in the computer-readable medium/memory 2112. The processor 2104 may include circuitry 2114 for detecting whether a UE is in an inactive state, circuitry 2116 for determining a measurement configuration, circuitry 2118 for generating a message comprising the measurement configuration, and circuitry 2120 for sending the message to a radio access network.

Figure 22:
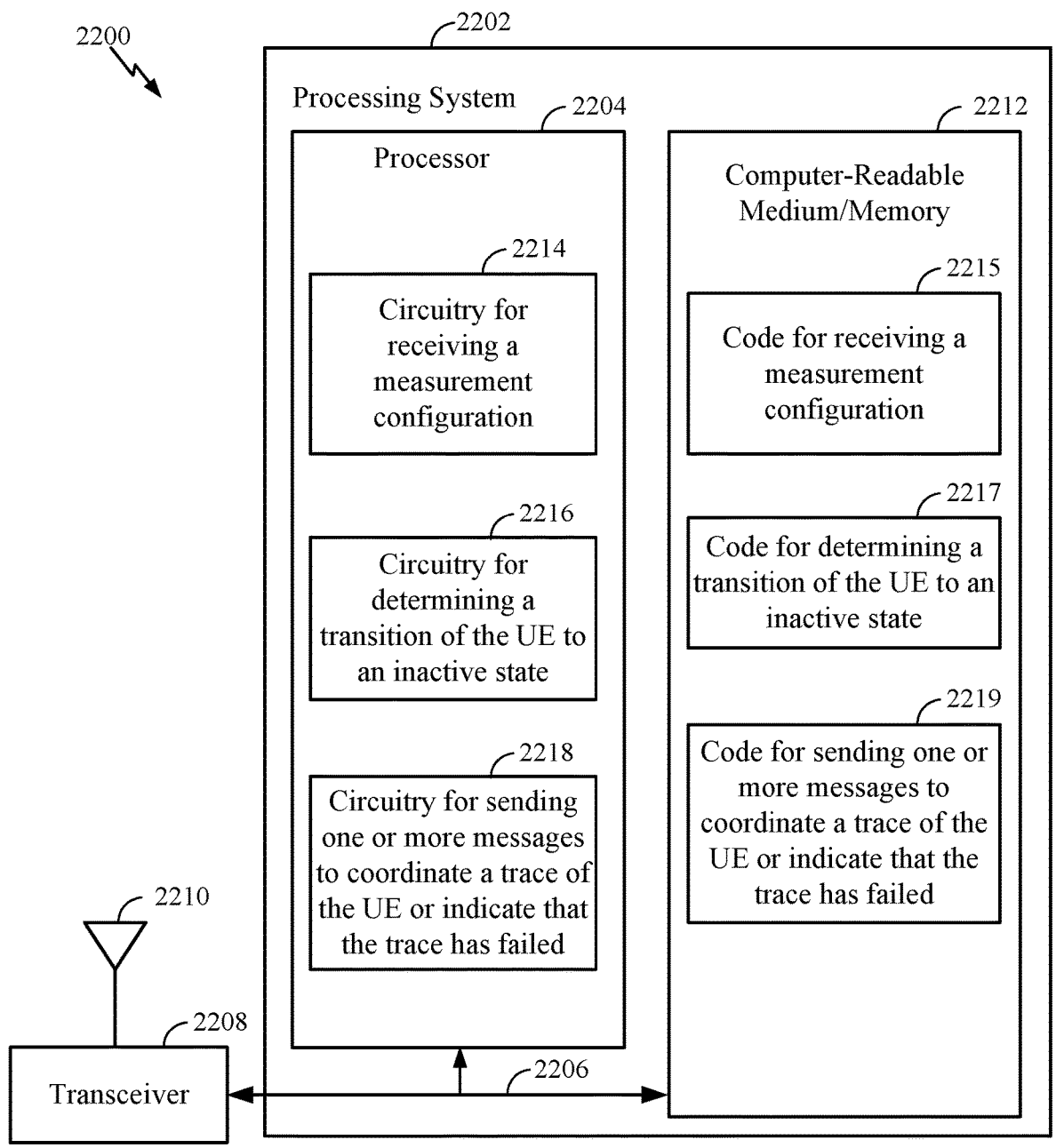

FIG. 22 illustrates a communications device 2200 that may include various components (e.g., corresponding to means-plus-function components) configured to perform operations for the techniques disclosed herein, such as the operations illustrated in FIG. 13. The communications device 2200 includes a processing system 2202 coupled to a transceiver 2208. The transceiver 2208 is configured to transmit and receive signals for the communications device 2200 via an antenna 2210, such as the various signals or messages as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer executable code) that when executed by the processor 2204, cause the processor 2204 to perform the operations described herein, or other operations for performing the various techniques discussed herein with respect to FIG. 13. In certain aspects, computer-readable medium/memory 2212 stores code 2215 for receiving a measurement configuration, code 2217 for determining a transition of the UE to an inactive state, and code 2219 for sending one or more messages to coordinate a trace of the UE or indicate that the trace has failed. In certain aspects, the processor 2204 has circuitry configured to implement the code stored in the computer-readable medium/memory 2212. The processor 2204 may include circuitry 2214 for receiving a measurement configuration, circuitry 2216 for determining a transition of the UE to an inactive state, and circuitry 2218 for sending one or more messages to coordinate a trace of the UE or indicate that the trace has failed.

Figure 23:
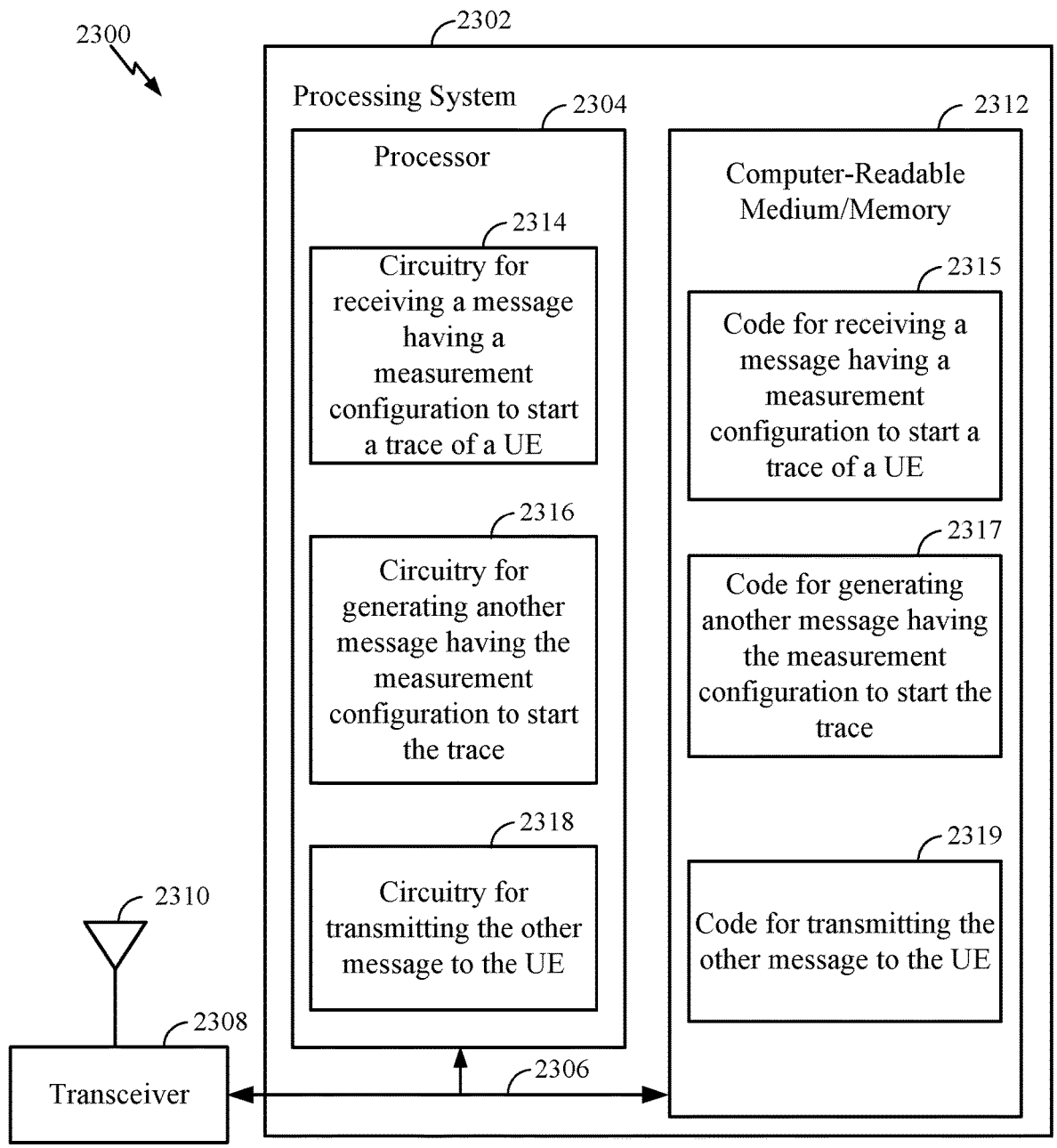

FIG. 23 illustrates a communications device 2300 that may include various components (e.g., corresponding to means-plus-function components) configured to perform operations for the techniques disclosed herein, such as the operations illustrated in FIG. 14. The communications device 2300 includes a processing system 2302 coupled to a transceiver 2308. The transceiver 2308 is configured to transmit and receive signals for the communications device 2300 via an antenna 2310, such as the various signals or messages as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer executable code) that when executed by the processor 2304, cause the processor 2304 to perform the operations described herein, or other operations for performing the various techniques discussed herein with respect to FIG. 14. In certain aspects, computer-readable medium/memory 2312 stores code 2315 for receiving a message having a measurement configuration to start a trace of a UE, code 2317 for generating another message having the measurement configuration to start the trace, and code 2319 for transmitting the other message to the UE. In certain aspects, the processor 2304 has circuitry configured to implement the code stored in the computer-readable medium/memory 2312. The processor 2304 may include circuitry 2314 for receiving a message having a measurement configuration to start a trace of a UE, code 2316 for generating another message having the measurement configuration to start the trace, and code 2318 for transmitting the other message to the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
receiving, at a first radio access network (RAN) from an access and mobility management function (AMF) network entity, a measurement configuration to start a trace of a user-equipment (UE), wherein the first RAN comprises a first base station;
determining, by the first RAN, a transition of the UE to an inactive state; and
sending, by the first RAN, one or more messages in response to the determination that the UE is in the inactive state, wherein the one or more messages comprise:
a paging message to a second RAN indicating to trigger the transition of the UE to a connected state from the inactive state, wherein the second RAN comprises a second base station,
a message comprising the measurement configuration to start the trace of the UE to the second RAN, and
an indication to the AMF network entity that the trace of the UE is deactivated.

2. The method of claim 1, wherein the paging message triggers a protocol for the UE to enter the connected state from the inactive state.

3. The method of claim 1, further comprising receiving a request from a second RAN to receive context of the UE, wherein sending the one or more messages comprises sending a UE context response message having the context of the UE to the second RAN in response to the reception of the request.

4. The method of claim 3, wherein the UE context response message indicates the measurement configuration.

5. The method of claim 1, further comprising:
updating a previously cached UE context with the measurement configuration; and
receiving a request from a second RAN for a context of the UE, wherein sending the one or more messages comprises sending a UE context response message having the updated UE context to the second RAN in response to the reception of the request for the context of the UE.

6. The method of claim 5, wherein:
the method further comprises selecting whether to defer the start of the trace until the UE transitions to a connected state or to trigger the transition to the connected state for the trace; and
if the selection comprises selecting to trigger the transition, the sending of the one or more messages further comprises sending the RAN paging message to the second RAN to trigger the transition of the UE to the connected state prior to the reception of the request for the context of the UE.

7. The method of claim 6, wherein the selection is based on an indication from the AMF network entity or based a context of the UE.

8. The method of claim 1, wherein:
the measurement configuration comprises an immediate minimization of drive test (MDT) configuration;
the determination comprises determining that the UE has transitioned to the inactive state while configured with the immediate MDT configuration;

the method further comprises:
  storing the immediate MDT configuration based on the determination; and
  configuring the UE to resume the trace after the UE has entered a connected state.

9. The method of claim 1, wherein:
sending the one or more messages comprises sending a message to coordinate the trace of the UE with the measurement configuration received from the AMF network entity;
the measurement configuration comprises a logged minimization of drive test (MDT) configuration; and
if the UE transitions to the inactive state while configured with the logged MDT configuration, the logged MDT configuration is valid only while the UE is within an area scope set by the AMF network entity in the measurement configuration.

10. The method of claim 9, further comprising configuring the UE with a RAN notification area (RNA), wherein the logged MDT configuration is further valid only while the UE is within the RNA.

11. The method of claim 1, wherein:
the measurement configuration comprises a configuration for a logged minimization of drive test (MDT); and
the method further comprises configuring the UE with a RAN notification area (RNA) when the UE transitions to the inactive state; and
sending the one or more message comprises sending a radio resource control (RRC) release message to the UE for the transition of the UE to the inactive state, the RRC release message configuring the logged MDT if the UE is within the RNA.

12. A method for wireless communication, comprising:
detecting, by an access and mobility management function (AMF) network entity, a state of a user-equipment (UE);
determining, by the AMF network entity, a minimization of drive test (MDT) configuration to start a trace of the UE based on the detection, wherein the determined MDT configuration is a logged MDT configuration based on the UE being in an inactive state or an immediate MDT configuration based on the UE not being in the inactive state;
generating, by the AMF network entity, a message comprising the MDT configuration; and
sending, by the AMF network entity, the message to a radio access network (RAN) to coordinate the trace, wherein the RAN comprises a base station.

13. A method for wireless communication, comprising:
receiving, by a first radio access network (RAN) from a second RAN, a first message having a measurement configuration to start a trace of a user equipment (UE) that is in an inactive state, wherein the first RAN comprises a first base station and the second RAN comprises a second base station;
determining, by the first RAN, in response to the first message, to transmit a path switch request to an access and mobility management function (AMF) network entity;
transmitting, by the first RAN to the AMF, the path switch request;
receiving, by the first RAN from the AMF network entity in response to the path switch request, a second message indicating measurement configuration to start a trace of the UE; and
transmitting, by the first RAN to the UE, the measurement configuration.

14. The method of claim 13, further comprising:
sending a UE context request message to the second RAN;
receiving a UE context response message from the second RAN; and
transmitting a radio resource control (RRC) resume message to the UE after receiving the UE context response message.

15. The method of claim 14, further comprising:
receiving a RAN paging message from the second RAN; and
transmitting a paging message to the UE to transition the UE from the inactive state to a connected state prior to the transmission of the measurement configuration.

16. The method of claim 14, further comprising receiving an RRC resume request from the UE.

17. A first radio access network (RAN) comprising a first base station, comprising:
a memory comprising instructions; and
one or more processors, individually or collectively, configured to execute the instructions and cause the first RAN to:
  receive from an access and mobility management function (AMF) network entity a measurement configuration to start a trace of a user-equipment (UE);
  determine a transition of the UE to an inactive state; and
  send one or more messages in response to the determination that the UE is in the inactive state, wherein the one or more messages comprise:
    a paging message to a second RAN comprising a second base station indicating to trigger the transition of the UE to a connected state from the inactive state,
    a message comprising the measurement configuration to start the trace of the UE to the second RAN, and
    an indication to the AMF network entity that the trace of the UE is deactivated.

18. An access and mobility management function (AMF) network entity, comprising:
a memory comprising instructions; and
one or more processors, individually or collectively, configured to execute the instructions and cause the AMF network entity to:
  detect a state of a user-equipment (UE);
  determine a minimization of drive test (MDT) configuration to start a trace of the UE based on the detection, wherein the determined MDT configuration is a logged MDT configuration based on the UE being in an inactive state or an immediate MDT configuration based on the UE not being in the inactive state;
  generate a message comprising the MDT configuration; and
  send the message to a radio access network (RAN) to coordinate the trace.

19. A first radio access network (RAN) comprising a first base station, comprising:
a memory comprising instructions; and
one or more processors, individually or collectively, configured to execute the instructions and cause the first RAN to:
  receive from a second RAN comprising a second base station a first message having a measurement configuration to start a trace of a user equipment (UE) that is in an inactive state;

determine, in response to the first message, to transmit a path switch request to an access and mobility management function (AMF) network entity;

transmit, to the AMF network entity, the path switch request;

receive, from the AMF network entity in response to the path switch request, a second message indicating measurement configuration to start a trace of the UE; and transmit, to the UE, the measurement configuration.

* * * * *